(12) United States Patent
Uzawa et al.

(10) Patent No.: US 11,463,382 B2
(45) Date of Patent: Oct. 4, 2022

(54) COMMUNICATION CONTROL SYSTEM AND COMMUNICATION CONTROL METHOD

(71) Applicant: Nippon Telegraph and Telephone Corporation, Tokyo (JP)

(72) Inventors: Hiroyuki Uzawa, Tokyo (JP); Takahiro Kubo, Tokyo (JP); Daisuke Hisano, Tokyo (JP); Yu Nakayama, Tokyo (JP); Yoichi Fukada, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/271,111

(22) PCT Filed: Aug. 15, 2019

(86) PCT No.: PCT/JP2019/032027
§ 371 (c)(1),
(2) Date: Feb. 24, 2021

(87) PCT Pub. No.: WO2020/045104
PCT Pub. Date: Mar. 5, 2020

(65) Prior Publication Data
US 2021/0336902 A1    Oct. 28, 2021

(30) Foreign Application Priority Data
Aug. 27, 2018   (JP) .............................. JP2018-158304

(51) Int. Cl.
*H04L 49/351* (2022.01)
*H04L 43/0829* (2022.01)

(52) U.S. Cl.
CPC ........ *H04L 49/351* (2013.01); *H04L 43/0829* (2013.01)

(58) Field of Classification Search
CPC .......................... H04L 43/0829; H04L 49/351
See application file for complete search history.

(56) References Cited

U.S. PATENT DOCUMENTS 6,243,359 B1 * 6/2001 Roy .................... H04Q 11/0478
                                                                370/429
6,272,143 B1 * 8/2001 Lin ......................... H04L 47/32
                                                                370/414

(Continued)

OTHER PUBLICATIONS

Anzai et al., "10Gbits/s Traffic Shaper, 10GbE compatible bandwidth controller, Development of PureFlow GSX-XR," Anritsu Technical, Mar. 2013, 88:46-52.

(Continued)

*Primary Examiner* — Khaled M Kassim
(74) *Attorney, Agent, or Firm* — Fish & Richardson P.C.

(57) ABSTRACT

A communication control system is a communication control system including: a plurality of layer 2 switches; and a control apparatus. Each of the plurality of layer 2 switches includes a queue having a queue length being adjustable for each of transfer routes of data, and a transmission unit configured to transmit the data stored in the queue for each of the transfer routes to a subsequent destination of the data at a data rate being adjustable for each of the transfer routes. The control apparatus includes an adjustment processing unit configured to acquire information representing a discarded data amount being a data amount of the data discarded in the queue from one of the plurality of layer 2 switches having discarded the data, and adjust the queue length and the data rate of each of the plurality of layer 2 switches for each of the transfer routes, based on the discarded data amount.

6 Claims, 19 Drawing Sheets

(56) References Cited

U.S. PATENT DOCUMENTS

| | | | |
|---|---|---|---|
| 7,324,535 B1* | 1/2008 | Goss | H04L 45/50 370/235 |
| 2002/0080721 A1* | 6/2002 | Tobagi | H04L 69/163 370/236 |
| 2005/0007989 A1* | 1/2005 | Wittmann | H04L 47/35 370/352 |
| 2006/0146722 A1* | 7/2006 | Dube | H04L 41/145 370/241 |
| 2007/0165633 A1* | 7/2007 | Ikegami | H04L 12/1881 370/390 |
| 2009/0245104 A1* | 10/2009 | Nishimura | H04L 47/10 370/412 |
| 2011/0075577 A1* | 3/2011 | Chen | H04L 43/50 370/252 |
| 2011/0176418 A1* | 7/2011 | Gershinsky | H04L 47/32 370/230.1 |
| 2011/0261145 A1* | 10/2011 | Kamath | H04N 7/148 348/E7.083 |
| 2011/0286468 A1* | 11/2011 | Tomonaga | H04L 47/30 370/412 |
| 2012/0166670 A1* | 6/2012 | Kure | H04N 21/6437 709/233 |
| 2012/0213078 A1* | 8/2012 | Kitada | H04L 47/17 370/236 |
| 2012/0250635 A1* | 10/2012 | Gao | H04W 72/1236 370/329 |
| 2012/0275325 A1* | 11/2012 | Rikitake | H04L 49/205 370/252 |
| 2014/0016463 A1* | 1/2014 | Kitada | H04L 47/20 370/230.1 |
| 2014/0192819 A1* | 7/2014 | Nishimura | H04L 49/206 370/412 |
| 2014/0255027 A1* | 9/2014 | Hood | H04Q 11/0067 398/58 |
| 2015/0156125 A1* | 6/2015 | Skarve | H04L 47/56 370/230 |
| 2017/0295113 A1* | 10/2017 | Francini | H04L 47/622 |
| 2018/0275913 A1* | 9/2018 | Mitkar | G06F 11/1469 |
| 2019/0097938 A1* | 3/2019 | Talla | H04L 47/365 |

OTHER PUBLICATIONS

PCT International Search Report in International Appln. No. PCT/JP2019/032027, dated Oct. 18. 2019, 4 pages (with English Translation).

Uzawa et al., "[Invited Lecture] Layer-2 Network Control Techniques for Multiservice Accommodation toward 5G/IoT era," IEICE, Technical Report, 2018, 118(206):35-40.

* cited by examiner

COMMUNICATION CONTROL SYSTEM AND COMMUNICATION CONTROL METHOD

CROSS-REFERENCE TO RELATED APPLICATIONS

This application is a National Stage application under 35 U.S.C. § 371 of International Application No. PCT/JP2019/032027, having an International Filing Date of Aug. 15, 2019, which claims priority to Japanese Application Serial No. 2018-158304, filed on Aug. 27, 2018. The disclosure of the prior application is considered part of the disclosure of this application, and is incorporated in its entirety into this application.

TECHNICAL FIELD

The present invention relates to a communication control system and a communication control method.

BACKGROUND ART

Internet of Thing (IoT) terminals are deployed at various places depending on their applications. An IoT terminal communicates with an IoT server via an IoT-GW (for example, a radio base station) being a gateway apparatus for IoT, based on a command given from the IoT server to the IoT terminal.

FIG. 20 is a diagram illustrating a configuration example of a communication control system of related art. Each IoT terminal is connected to the IoT-GW by means of wireless communication or wired communication. The IoT-GW executes bidirectional communication with the IoT server via a layer 2 network (L2NW), which is a network including layer 2 switches (hereinafter referred to as "SWs"). The L2NW encapsulates data transmitted from the IoT-GW or the IoT server into frames for transfer in the L2NW. One example of a communication protocol for such encapsulated data is Provider Backbone Bridging (PBB).

The L2NW forms a connection path in advance, such that IoT-GW #1, IoT-GW #2, and IoT server #1 exclusively communicate with each other. In FIG. 20, an identifier of the connection path (flow ID) is 100 as an example. The flow ID is, for example, a "VLAN ID". A transfer frame including data transferred from IoT-GW #1 is assigned a header for transfer. In FIG. 20, the header for transfer includes a Media Access Control address (MAC address) of SW #1 being a transmission source of the transfer frame, a MAC destination address (MAC DA) representing a MAC address of SW #4 connected to IoT server #1, and the flow ID "100".

SW #1 identifies an SW being a subsequent destination of the transfer frame (hereinafter referred to as a "subsequent destination SW"), based on the header for transfer assigned to the received transfer frame and a transfer route table. In the transfer route table, the flow ID, the MAC destination address, and the subsequent destination SW are associated with each other. In a transfer route for the flow ID "100", a subsequent destination SW of the transfer frame transmitted from SW #1 is SW #3. Accordingly, SW #1 transfers the transfer frame to SW #3. SW #3 identifies SW #4 being a subsequent destination SW of the transfer frame, based on the header for transfer assigned to the received transfer frame and the transfer route table. SW #3 transfers the transfer frame to SW #4.

SW #4 determines whether or not a termination SW of the transfer route for the flow ID "100" is SW #4, based on the header for transfer assigned to the received transfer frame and the transfer route table. If the termination SW is SW #4, SW #4 removes the header for transfer from the transfer frame, and transfers the transfer frame to IoT server #1.

An IoT server may accommodate a plurality of IoT-GWs by using a transfer route having the same flow ID. For example, pieces of data substantially simultaneously transmitted from a plurality of IoT terminals to the same IoT server, such as data for connection request and sensing data, are multiplexed on the transfer route having the same flow ID with respect to time, reaching the IoT server in the form of microburst traffic. In this case, when a data rate of the data for connection request reaching the IoT server instantaneously exceeds a processing speed of the IoT server, a part of the data for connection request is discarded. This causes the IoT terminals to retransmit the data for connection request.

To prevent such discarding of data, it is necessary that a microburst be leveled out, that is, the data rate of transferred data be kept at or below the processing speed of the IoT server (specified data rate) (see NPL 1).

CITATION LIST

Non Patent Literature

NPL 1: Kenji Anzai and eight others, "Development of 10 Gbits/s Traffic Shaper", Anritsu Technical, No. 88 March 2013

SUMMARY OF THE INVENTION

Technical Problem

However, it is difficult to predict which one of the layer 2 switches will cause a microburst in the L2NW. For this reason, the communication control system of the related art may fail to level out a microburst unless each SW is provided with a large-capacity buffer for storing transferred data.

In the light of the circumstances described above, the present invention has an object to provide a communication control system and a communication control method capable of leveling out a microburst without providing a large-capacity buffer in each SW.

Means for Solving the Problem

One aspect of the present invention is a communication control system including: a plurality of layer 2 switches; and a control apparatus, wherein: each of the plurality of layer 2 switches includes a queue having a queue length being adjustable for each of transfer routes of data, and a transmission unit configured to transmit the data stored in the queue for each of the transfer routes to a subsequent destination of the data at a data rate being adjustable for each of the transfer routes; and the control apparatus includes an adjustment processing unit configured to acquire information representing a discarded data amount being a data amount of the data discarded in the queue from one of the plurality of layer 2 switches having discarded the data, and adjust the queue length and the data rate of each of the plurality of layer 2 switches for each of the transfer routes, based on the discarded data amount.

One aspect of the present invention is the communication control system described above, wherein the adjustment processing unit acquires a data table including the subsequent destination information being information representing the subsequent destination from each of the plurality of layer 2 switches, identifies first one of the plurality of layer 2 switches serving as a starting point and second one of the plurality of layer 2 switches serving as an end point in one of the transfer routes based on each piece of the subsequent destination information, and identifies the one of the transfer routes by tracking each piece of the subsequent destination information sequentially from the data table acquired from the first one of the plurality of layer 2 switches serving as the starting point to the data table acquired from the second one of the plurality of layer 2 switches serving as the end point.

One aspect of the present invention is the communication control system described above, wherein the adjustment processing unit determines whether or not the one of the plurality of layer 2 switches having discarded the data is present for each of the transfer routes based on the discarded data amount, and in accordance with a determination that the one of the plurality of layer 2 switches having discarded the data is present, in the one of the transfer routes, the adjustment processing unit adjusts, for each of the transfer routes, the queue length and the data rate so that the data of the discarded data amount is stored in a distributed manner in layer 2 switches at a subsequent stage with respect to the one of the plurality of layer 2 switches having discarded the data among the plurality of layer 2 switches and the one of the plurality of layer 2 switches having discarded the data.

One aspect of the present invention is the communication control system described above, wherein the adjustment processing unit determines whether or not the one of the plurality of layer 2 switches having discarded the data is present for each of the transfer routes based on the discarded data amount, and in accordance with a determination that the one of the plurality of layer 2 switches having discarded the data is present, in the one of the transfer routes, the adjustment processing unit adjusts, for each of the transfer routes, the queue length and the data rate so that the data of the discarded data amount is stored in a distributed manner in each of the plurality of layer 2 switches other than the one of the plurality of layer 2 switches serving as the starting point.

One aspect of the present invention is a communication control method executed by a communication control system including a plurality of layer 2 switches and a control apparatus, each of the plurality of layer 2 switches including a queue having a queue length being adjustable for each of transfer routes of data, and a transmission unit that transmits the data stored in the queue for each of the transfer routes to a subsequent destination of the data at a data rate being adjustable for each of the transfer routes, the communication control method including: at the control apparatus, acquiring information representing a discarded data amount being a data amount of the data discarded in the queue from one of the plurality of layer 2 switches having discarded the data, and adjusting the queue length and the data rate of each of the plurality of layer 2 switches for each of the transfer routes based on the discarded data amount.

One aspect of the present invention is the communication control method described above, including, at the adjustment processing unit, acquiring a data table including the subsequent destination information being information representing the subsequent destination from each of the plurality of layer 2 switches, identifying first one of the plurality of layer 2 switches serving as a starting point and second one of the plurality of layer 2 switches serving as an end point in one of the transfer routes based on each piece of the subsequent destination information, and identifying the one of the transfer routes by tracking each piece of the subsequent destination information sequentially from the data table acquired from the first one of the plurality of layer 2 switches serving as the starting point to the data table acquired from the second one of the plurality of layer 2 switches serving as the end point.

One aspect of the present invention is the communication control method described above, including, at the adjustment processing unit, determining whether or not the one of the plurality of layer 2 switches having discarded the data is present for each of the transfer routes based on the discarded data amount, and in accordance with a determination that the one of the plurality of layer 2 switches having discarded the data is present, in the one of the transfer routes, at the adjustment processing unit, adjusting, for each of the transfer routes, the queue length and the data rate so that the data of the discarded data amount is stored in a distributed manner in layer 2 switches at a subsequent stage with respect to the one of the plurality of layer 2 switches having discarded the data among the plurality of layer 2 switches and the one of the plurality of layer 2 switches having discarded the data.

One aspect of the present invention is the communication control method described above, including, at the adjustment processing unit, determining whether or not the one of the plurality of layer 2 switches having discarded the data is present for each of the transfer routes based on the discarded data amount, and in accordance with a determination that the one of the plurality of layer 2 switches having discarded the data is present, in the one of the transfer routes, at the adjustment processing unit, adjusting, for each of the transfer routes, the queue length and the data rate so that the data of the discarded data amount is stored in a distributed manner in each of the plurality of layer 2 switches other than the one of the plurality of layer 2 switches serving as the starting point.

Effects of Invention

According to the present invention, a microburst can be leveled out without providing a large-capacity buffer in each SW.

DESCRIPTION OF EMBODIMENTS

Embodiments of the present invention will be described in detail with reference to the drawings.

First Embodiment

Figure 1:
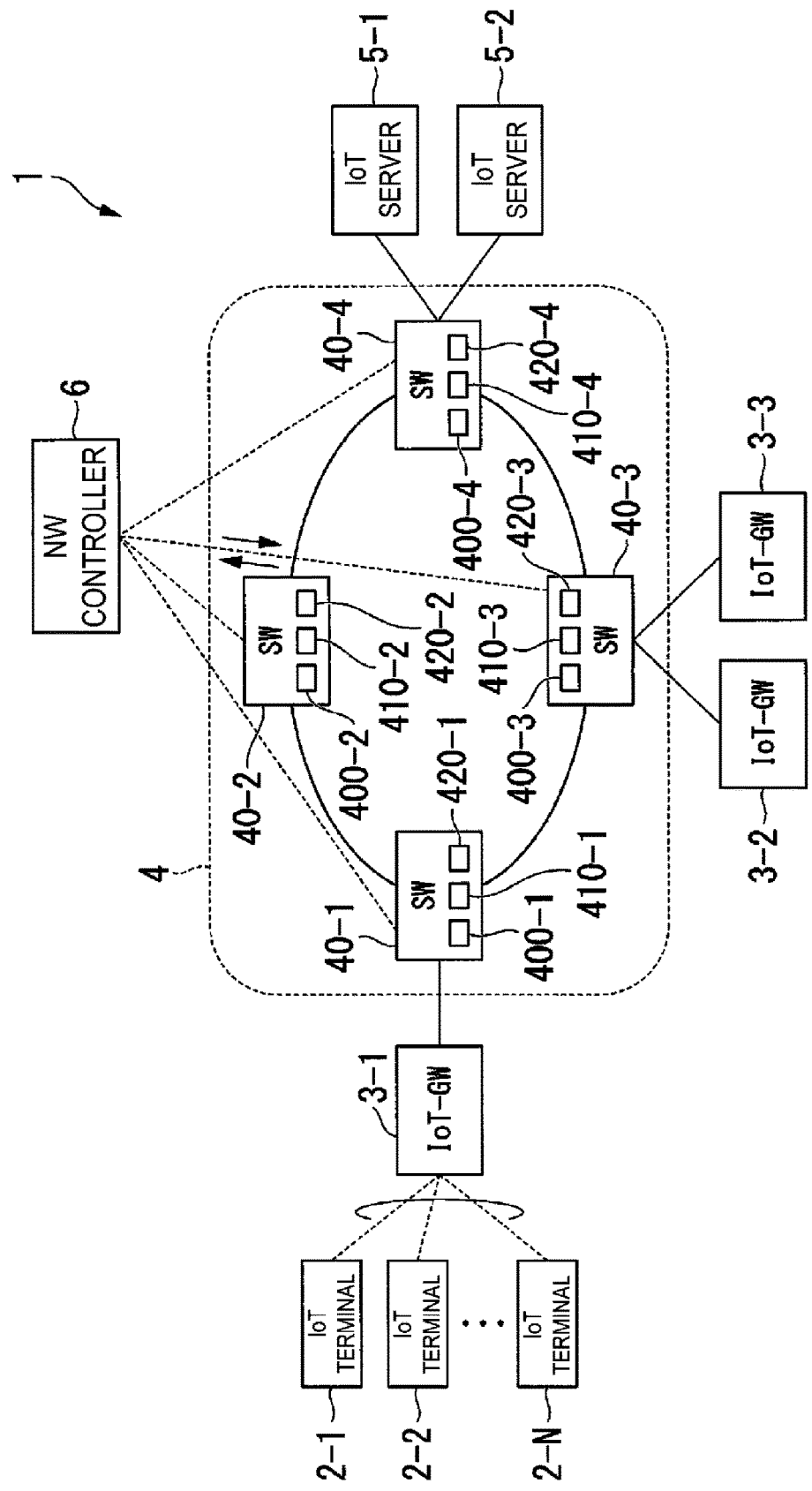
FIG. 1 is a diagram illustrating a configuration example of a communication control system according to a first embodiment.

FIG. 1 is a diagram illustrating a configuration example of a communication control system 1. The communication control system 1 is a system that controls a band for data to be transferred in an L2NW. The communication control system 1 includes IoT terminals 2-1 to 2-N(N is an integer of 1 or greater), IoT-GWs 3-1 to 3-M (M is an integer or 2 or greater; in one example, M is 3), an L2NW 4, IoT servers 5-1 to 5-P (P is an integer of 1 or greater; in one example, P is 2), and an L2NW controller 6.

Each IoT terminal 2 is a communication terminal for IoT. Each IoT terminal 2 is, for example, a household electrical appliance having a communication function, although the IoT terminal 2 is not limited to a specific communication terminal. Each IoT terminal 2 is connected to one of the IoT-GWs 3 by means of wireless communication or wired communication.

Each IoT-GW 3 is a gateway apparatus for IoT, one example of which is a radio base station. Each IoT-GW 3 bidirectionally communicates with one of the IoT servers 5 via the L2NW 4.

The L2NW 4 is a network including layer 2 switches. The L2NW 4 includes SWs 40-1 to 40-4. Each SW 40 is a layer 2 switch. Each SW 40 includes a control unit 400, queues 410, and a transmission unit 420. Each SW 40 includes as many queues 410 (buffers) as the number of flows in the L2NW 4. In other words, each SW 40 includes the queues 410 for individual flow IDs.

A data amount of discarded data is hereinafter referred to as a "discarded data amount". The control unit 400 controls operation of each of the functional units of the SW 40. The control unit 400 measures, for each queue 410, information representing a discarded data amount of the queue 410 in a period of a predetermined cycle. Specifically, the control unit 400 measures, for each flow ID, information representing a discarded data amount of the queue 410 in a period of a predetermined cycle.

The control unit 400 receives a signal (hereinafter referred to as a "request signal") for requesting the control unit 400 to report the discarded data amount of the queue 410 from the L2NW controller 6 in the predetermined cycle, for example. When the control unit 400 receives the request signal, the control unit 400 transmits information representing the measured discarded data amount of the queue 410 to the L2NW controller 6. When the control unit 400 transmits the information representing the measured discarded data amount of the queue 410, the control unit 400 initializes a stored value of the information representing the discarded data amount. When the control unit 400 initializes the stored value of the information representing the discarded data amount, the control unit 400 resumes measurement of the discarded data amount of the queue 410 in a period of the predetermined cycle.

The control unit 400 receives information representing a queue length from the L2NW controller 6 for each flow ID. The control unit 400 changes the queue length of the queue 410 that is associated with the flow ID, according to the information representing the queue length. The control unit 400 receives information representing a specified data rate (hereinafter referred to as a "leveling rate") from the L2NW controller 6 for each flow ID. The control unit 400 controls operation of the transmission unit 420 so that a data rate of data transmitted from the transmission unit 420 associated with the flow ID becomes equal to the leveling rate.

Each queue 410 stores, for each flow ID, pieces of data transferred from the IoT-GW 3 or another SW 40 to the queue 410. For example, in the SW 40-3, the queue 410-3 for a flow ID "100" stores pieces of data transferred from the IoT-GW 3-2 to the SW 40-3 by using a transfer route for the flow ID "100". In the SW 40-3, the queue 410-3 for a flow ID "101" stores pieces of data transferred from the IoT-GW 3-3 to the SW 40-3 by using a transfer route for the flow ID "101".

When the data amount of data transferred to the queue 410 exceeds the queue length of the queue 410 due to an occurrence of microburst traffic, the queue 410 discards data of the data amount that exceeds the queue length. The transmission unit 420 transmits the data stored in the queue 410 to another SW 40 or the IoT server 5 at the leveling rate.

Each IoT server 5 is a server that communicates with IoT terminals. Each IoT server 5 accommodates one or more IoT-GWs 3 by using a transfer route having the same flow ID. In FIG. 1, the transfer route for the flow ID "100" is a route that connects the IoT-GW 3-1, the SW 40-1, the SW 40-3, the SW 40-4, and the IoT server 5-1. The IoT server 5-1 accommodates the IoT-GWs 3-1 and 3-2 by using the transfer route for the flow ID "100". Note that the transfer route for the flow ID "100" may further include a route that connects the SW 40-2, the SW 40-4, and the IoT server 5-1.

The transfer route for the flow ID "101" is a route that connects the IoT-GW 3-3, the SW 40-3, the SW 40-4, and the IoT server 5-2. The IoT server 5-2 accommodates the IoT-GW 3-3 by using the transfer route for the flow ID "101".

The L2NW controller 6 is a control apparatus that executes transfer processing executed by the SWs of the L2NW. The L2NW controller 6 controls, for each SW 40, the queue length of the queue 410 and the leveling rate of data transmitted from the transmission unit 420.

When data is discarded in the queue 410, the L2NW controller 6 re-adjusts, for each SW 40, the queue length of the queue 410 and the leveling rate of data transmitted from the transmission unit 420, according to the discarded data amount of the queue 410. The L2NW controller 6 re-adjusts, for each SW 40, the queue length of the queue 410 and the leveling rate of data transmitted from the transmission unit 420 so that the data transmitted from the IoT-GW 3 is stored in a plurality of SWs 40 in a distributed manner.

Figure 2:
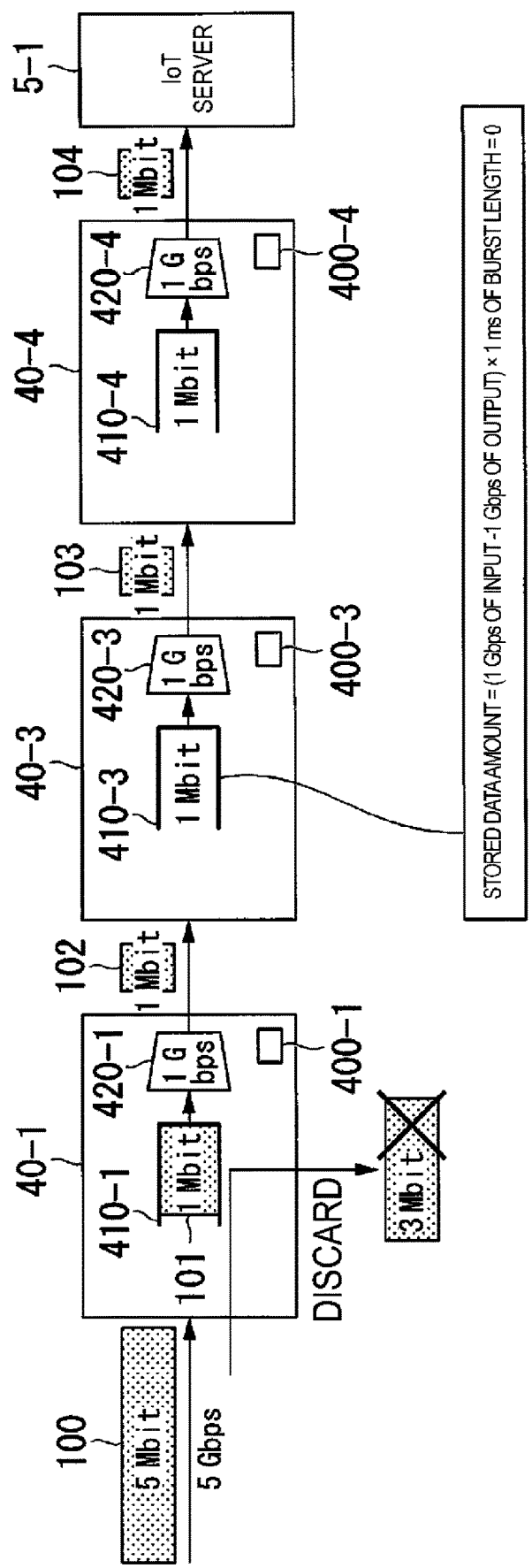
FIG. 2 is a first diagram illustrating an outline of an example of adjusting a queue length and a leveling rate according to the first embodiment.

FIG. 2 is a first diagram illustrating an outline of an example of adjusting the queue length and the leveling rate. A required value of an input rate with respect to the IoT server 5-1 is 1 Gbps. Similarly, in the transfer route for the flow ID "100", an initial value of the leveling rate of each SW 40 is 1 Gbps. In the transfer route for the flow ID "100", an initial value of the queue length of the queue 410 of each SW 40 is 1 Mbit.

In FIG. 2, the data rate of burst data 100 input to the SW 40-1 is 5 Gbps. In one example, it is assumed that there is an occurrence of such a microburst that a data rate of 5 Gbps continues during a period of a burst length of 1 ms. Thus, the data amount of the burst data 100 input to the SW 40-1 is 5 Mbit.

An initial value of the leveling rate set in the transmission unit 420-1 is 1 Gbps. Thus, the queue 410-1 transmits burst data 102 having a data amount of 1 Mbit out of the burst data 100 to the transmission unit 420-1 at 1 Gbps.

An initial value of the queue length of the queue 410-1 is 1 Mbit. The queue 410-1 stores burst data 101 having a data amount of 1 Mbit out of the burst data 100. The queue 410-1 discards the rest of the burst data 100, that is, data having a data amount of 3 Mbit. The control unit 400-1 transmits information representing the discarded data amount, which is the data amount (3 Mbit) of the burst data 100 discarded in the queue 410-1, to the L2NW controller 6.

In FIG. 2, in order to eliminate the need for the queue 410-1 to discard burst data when there is an occurrence of a microburst, the queue 410-1 needs to store data of a data amount of 4 Mbit (=(5 Gbps of input–1 Gbps of output)×1 ms of burst length).

An initial value of the queue length of the queue 410-3 is 1 Mbit. An initial value of the leveling rate set in the transmission unit 420-3 is 1 Gbps. Thus, the queue 410-3 transmits the burst data 102 to the transmission unit 420-3 at 1 Gbps without storing the burst data 102. The transmission unit 420-3 transmits the burst data 102 having a data amount of 1 Mbit to the SW 40-4 at 1 Gbps as burst data 103.

An initial value of the queue length of the queue 410-4 is 1 Mbit. An initial value of the leveling rate set in the transmission unit 420-4 is 1 Gbps. Thus, the queue 410-4 transmits the burst data 103 to the transmission unit 420-4 at 1 Gbps without storing the burst data 103. The transmission unit 420-4 transmits the burst data 103 having a data amount of 1 Mbit to the IoT server 5-1 at 1 Gbps, which satisfies the required value, as burst data 104.

Figure 3:
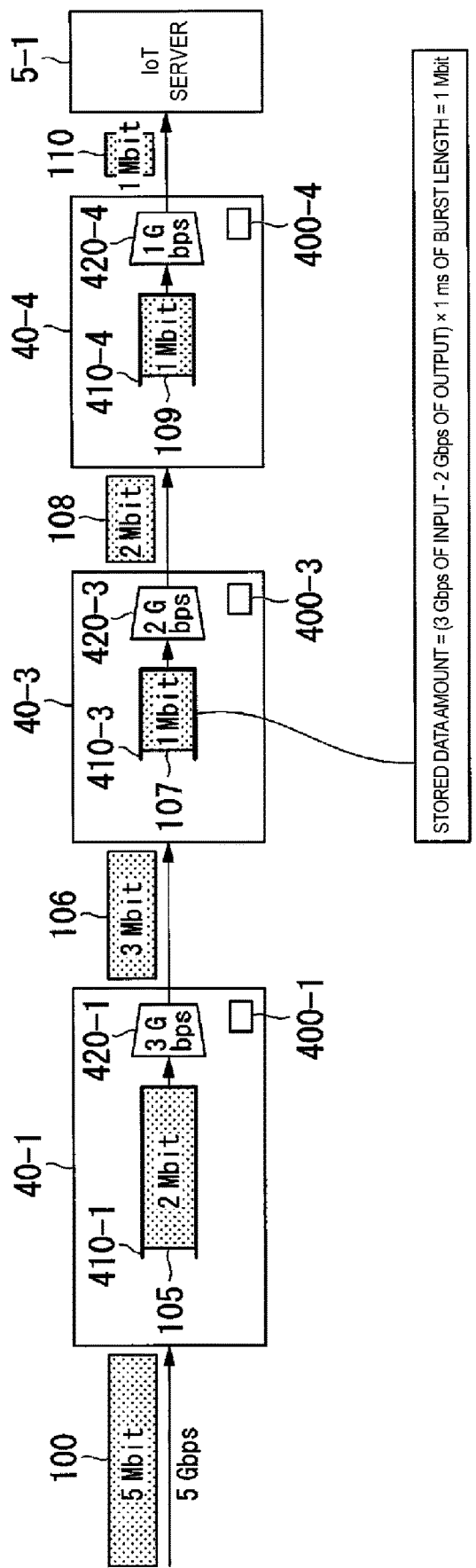
FIG. 3 is a second diagram illustrating an outline of an example of adjusting the queue length and the leveling rate according to the first embodiment.

FIG. 3 is a second diagram illustrating an outline of an example of adjusting the queue length and the leveling rate.

The L2NW controller 6 adjusts the data rate (leveling rate) of data transmitted from the SW 40-4 serving as the end point of the transfer route for the flow ID "100" to the IoT server 5-1 to 1 Gbps or below, which satisfies the required value of the input rate with respect to the IoT server 5-1.

The L2NW controller 6 re-adjusts, for each SW 40, the queue length of the queue 410 and the leveling rate of data transmitted from the transmission unit 420 so that the burst data 100 transmitted from the IoT-GW 3-1 is stored in a plurality of SWs 40 in a distributed manner. For example, the L2NW controller 6 re-adjusts the key length of the queue 410 of each SW 40 so that the data amount of the previously discarded burst data 100 is equally distributed to a group of SWs 40 at a subsequent stage in the transfer route for the flow ID "100".

With this configuration, the L2NW controller 6 can store the data having a data amount of 3 Mbit, which is discarded in FIG. 2, in the SWs 40 in the transfer route for the flow ID "100" in a distributed manner. The L2NW controller 6 can reduce the queue length of the queue 410 required for each SW 40.

Note that the L2NW controller 6 may distribute the data amount to be stored in each of the SWs 40 at a subsequent stage in the transfer route for the flow ID "100" by applying weights, with higher priority being given to SWs 40 having more free space (unassigned buffer space) in the queue 410 among the SWs 40 that are capable of increasing the queue length of the queue 410.

In FIG. 3, the control unit 400-1 sets the queue length of the queue 410-1 to 2 Mbit, in accordance with control of the L2NW controller 6. Accordingly, the queue 410-1 can store burst data 105 having a data amount of 2 Mbit (=(5 Gbps of input–3 Gbps of output)×1 ms of burst length) out of the burst data 100 of 5 Mbit. Because the control unit 400-1 sets the queue length of the queue 410-1 to 2 Mbit, the control unit 400-1 sets the leveling rate of data transmitted from the transmission unit 420-1 to 3 Gbps, in accordance with control of the L2NW controller 6.

The leveling rate set in the transmission unit 420-1 is 3 Gbps. Thus, the queue 410-1 transmits burst data 106 having a data amount of 3 Mbit out of the burst data 100 to the transmission unit 420-1. The transmission unit 420-1 transmits the burst data 106 having a data amount of 3 Mbit to the SW 40-3 at 3 Gbps.

In FIG. 3, the control unit 400-3 maintains the queue length of the queue 410-3 at 1 Mbit (=(3 Gbps of input–2 Gbps of output)×1 ms of burst length), in accordance with control of the L2NW controller 6. With this configuration, the queue 410-3 can store burst data 107 having a data amount of 1 Mbit out of the burst data 106 of 3 Mbit. The control unit 400-3 sets the leveling rate of data transmitted from the transmission unit 420-3 to 2 Gbps, in accordance with control of the L2NW controller 6.

The leveling rate set in the transmission unit 420-3 is 2 Gbps. Thus, the queue 410-3 transmits burst data 108 having a data amount of 2 Mbit out of the burst data 106 to the transmission unit 420-3. The transmission unit 420-3 transmits the burst data 108 having a data amount of 2 Mbit to the SW 40-4 at 2 Gbps.

In FIG. 3, the control unit 400-4 maintains the queue length of the queue 410-4 at 1 Mbit (=(2 Gbps of input–1 Gbps of output)×1 ms of burst length), in accordance with control of the L2NW controller 6. With this configuration, the queue 410-4 can store burst data 109 having a data amount of 1 Mbit out of the burst data 108 of 2 Mbit, which failed to be stored in the queues 410-1 and 410-3. The queue length of the queue 410-4 is 1 Mbit. Thus, the control unit 400-4 maintains the leveling rate of data transmitted from the transmission unit 420-4 at 1 Gbps, in accordance with control of the L2NW controller 6.

The leveling rate set in the transmission unit 420-4 is 1 Gbps. Thus, the queue 410-4 transmits burst data 109 having a data amount of 1 Mbit out of the burst data 108 to the transmission unit 420-4. The transmission unit 420-4 transmits the burst data 110 having a data amount of 1 Mbit to the IoT server 5-1 at 1 Gbps.

In FIG. 3, the discarded data having a data amount of 3 Mbit is equally distributed to respective SWs 40, with a data amount of 1 Mbit being distributed to each individual SW 40. Consequently, the NW controller 6 can prevent data transmitted from the IoT-GW 3-1 from being discarded. A maximum value of the queue length of the queue 410 of each SW 40 is reduced to 2 Mbit. Consequently, in comparison to a case in which only the queue 410-1 stores a part of the burst data 100, maximum capacity of each queue 410 (buffer) can be reduced.

The NW controller 6 re-adjusts the queue length and the leveling rate every time data is discarded due to an occurrence of a microburst.

Figure 4:
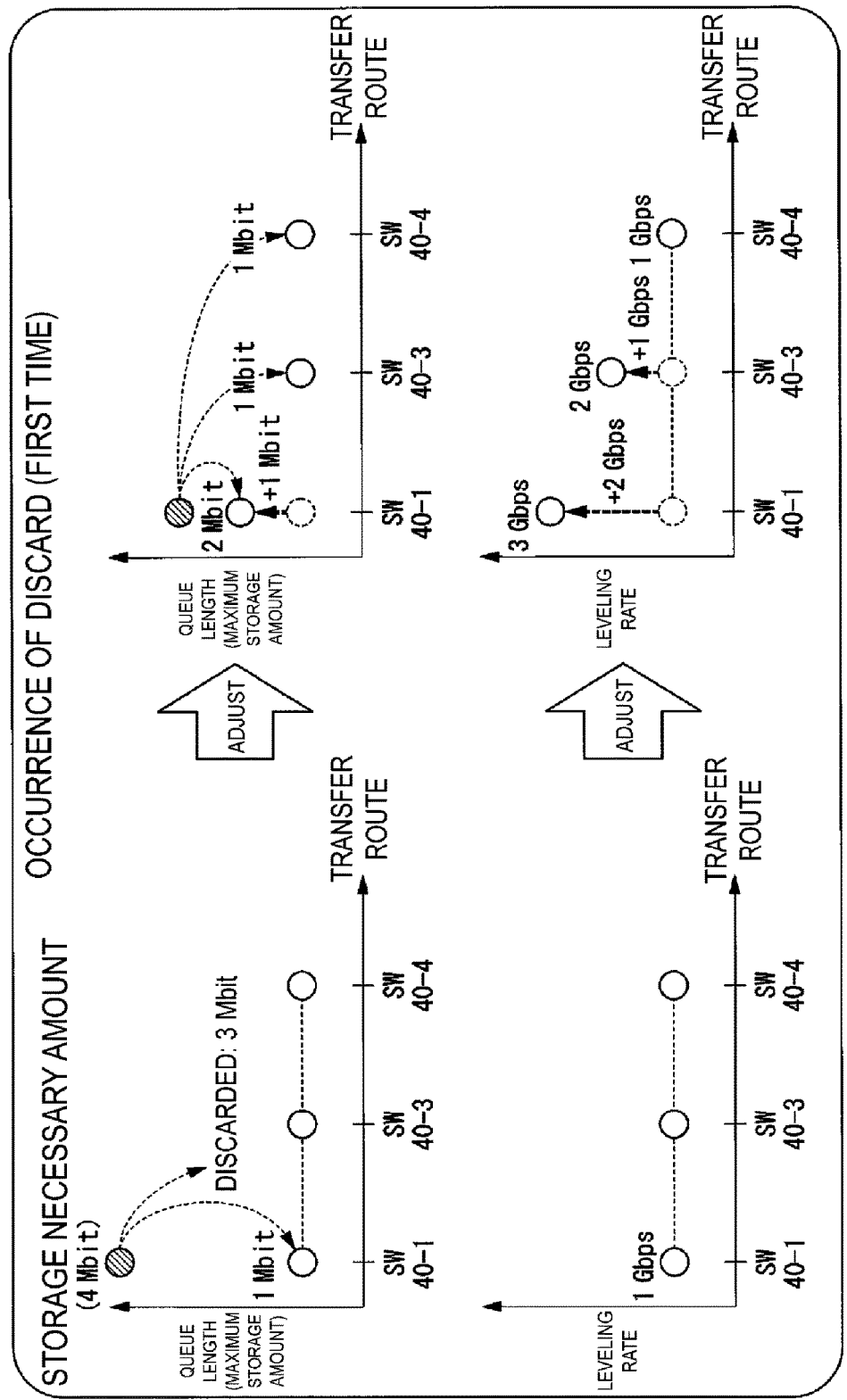
FIG. 4 is a first diagram illustrating details of an example of adjusting the queue length and the leveling rate according to the first embodiment.

FIG. 4 is a first diagram illustrating details of an example of adjusting the queue length and the leveling rate (first occurrence of discard). The graphs on the left side of FIG. 4 show a relationship between the transfer route and the queue length and a relationship between the transfer route and the smoothing rate in FIG. 2. In the lower left graph of FIG. 4, the smoothing rate of the transmission unit 420 of each SW 40 is 1 Gbps.

In the upper left graph of FIG. 4, the queue length of the queue 410-1 of the SW 40-1 is 1 Mbit. The queue length of the queue 410-3 of the SW 40-3 is 1 Mbit. The queue length of the queue 410-4 of the SW 40-4 is 1 Mbit. In FIG. 4, the storage necessary amount of the SW 40-1 is 4 Mbit, and the SW 40-1 thus discards data having a data amount of 3 Mbit.

The graphs on the right side of FIG. 4 show a relationship between the transfer route and the queue length (after adjustment) and a relationship between the transfer route and the smoothing rate (after adjustment) in FIG. 3. In the lower right graph of FIG. 4, the smoothing rate of the transmission unit 420-1 of the SW 40-1 is 3 Gbps. The smoothing rate of the transmission unit 420-3 of the SW 40-3 is 2 Gbps. The smoothing rate of the transmission unit 420-4 of the SW 40-4 is 1 Gbps.

In the upper right graph of FIG. 4, the queue length of the queue 410-1 of the SW 40-1 is 2 Mbit. The queue length of the queue 410-3 of the SW 40-3 is 1 Mbit. The queue length of the queue 410-4 of the SW 40-4 is 1 Mbit. The storage necessary amount of the SW 40-1 is 2 Mbit, and the SW 40-1 thus does not discard data. The SW 40-4 transmits the burst data to the IoT server 5-1 at 1 Gbps.

Figure 5:
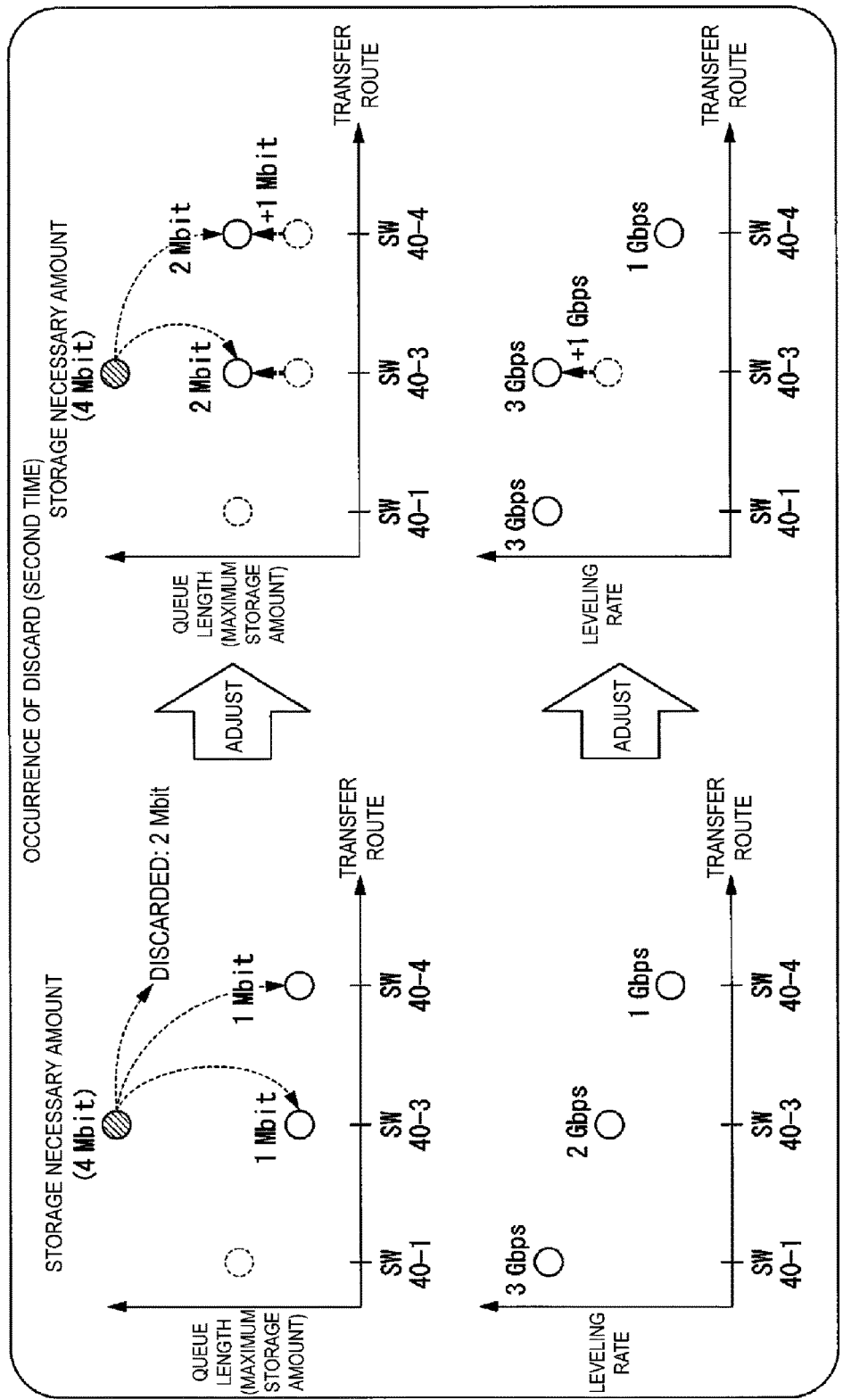
FIG. 5 is a second diagram illustrating details of an example of adjusting the queue length and the leveling rate according to the first embodiment.

FIG. 5 is a second diagram illustrating details of an example of adjusting the queue length and the leveling rate (second occurrence of discard). The graphs on the left side of FIG. 5 show a relationship between the transfer route and the queue length (after adjustment) and a relationship between the transfer route and the smoothing rate (after adjustment) in FIG. 3. In the lower left graph of FIG. 5, the smoothing rate of the transmission unit 420-1 of the SW 40-1 is 3 Gbps. The smoothing rate of the transmission unit 420-3 of the SW 40-3 is 2 Gbps. The smoothing rate of the SW 40-4 the transmission unit 420-4 is 1 Gbps. In the upper left graph of FIG. 5, the queue length of the queue 410-1 of the SW 40-1 is 2 Mbit. The queue length of the queue 410-3 of the SW 40-3 is 1 Mbit. The queue length of the queue 410-4 of the SW 40-4 is 1 Mbit.

In FIG. 5, the storage necessary amount of the SW 40-3 is 4 Mbit. The SW 40-3 discards data having a data amount of 1 Mbit. The SW 40-3 transmits the burst data 108 having a data amount of 2 Mbit to the SW 40-4 at 2 Gbps. The SW 40-4 discards data having a data amount of 1 Mbit.

The graphs on the right side of FIG. 5 show a relationship between the transfer route and the queue length (after re-adjustment) and a relationship between the transfer route and the smoothing rate (after re-adjustment). In the lower right graph of FIG. 5, the smoothing rate of the transmission unit 420-1 of the SW 40-1 is 3 Gbps. The smoothing rate of the transmission unit 420-3 of the SW 40-3 is 3 Gbps. The smoothing rate of the transmission unit 420-4 of the SW 40-4 is 1 Gbps. In the upper right graph of FIG. 5, the queue length of the queue 410-1 of the SW 40-1 is 2 Mbit. The queue length of the queue 410-3 of the SW 40-3 is 2 Mbit. The queue length of the queue 410-4 of the SW 40-4 is 2 Mbit.

In FIG. 5, the storage necessary amount of the SW 40-3 is 4 Mbit. The SW 40-3 does not discard data. The SW 40-3 transmits the burst data 108 having a data amount of 2 Mbit to the SW 40-4 at 3 Gbps. The SW 40-4 does not discard data. The SW 40-4 transmits the burst data to the IoT server 5-1 at 1 Gbps.

Figure 6:
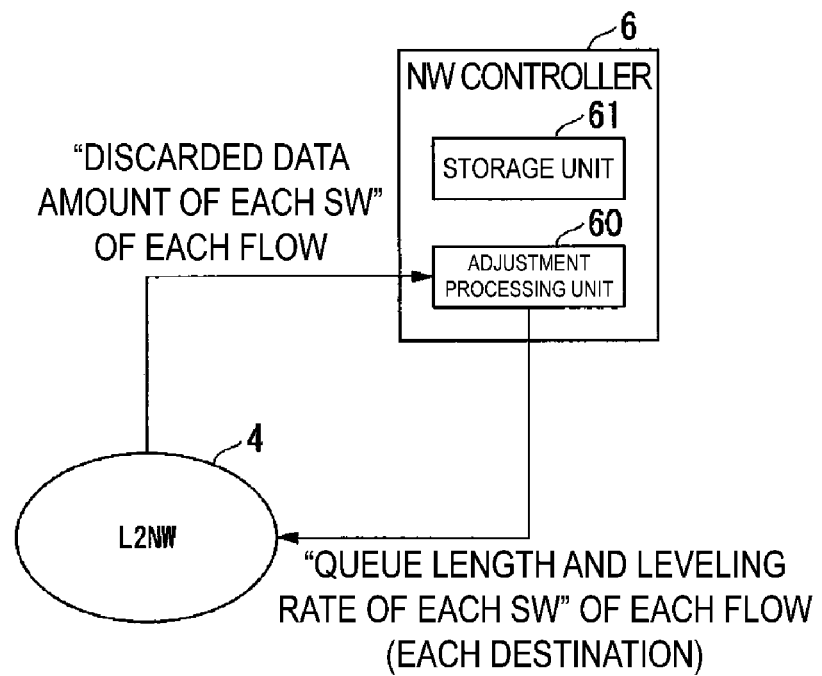
FIG. 6 is a diagram illustrating a configuration example of an NW controller according to the first embodiment.

Next, details of a configuration example of the NW controller 6 will be described. FIG. 6 is a diagram illustrating a configuration example of the NW controller 6. The NW controller 6 includes an adjustment processing unit 60 and a storage unit 61. The adjustment processing unit 60 is implemented by a processor such as a central processing unit (CPU) executing a program stored in the storage unit. The adjustment processing unit 60 may be implemented by using hardware such as large scale integration (LSI) and an application specific integrated circuit (ASIC).

The storage unit 61 includes a non-volatile recording medium (non-transitory recording medium) such as a flash memory and a hard disk drive (HDD). The storage unit 61 may include a volatile recording medium such as a random access memory (RAM) and a register. The storage unit 61 stores, for example, data tables and programs.

When initial values of the queue length and the leveling rate are set in each SW 40, data may be discarded every time a microburst occurs in certain cases. The adjustment processing unit 60 acquires information representing a discarded data amount of each queue 410 from each control unit 400 in a predetermined cycle. The adjustment processing unit 60 may acquire information representing the number of transfer frames including discarded data from each control unit 400, instead of the information representing a discarded data amount. In this case, the discarded data amount is expressed as "number of transfer frames including discarded data×maximum frame length". The adjustment processing unit 60 may acquire information representing a data amount exceeding a queue length threshold that is predetermined for each individual queue 410 from each control unit 400, instead of the information representing a discarded data amount.

The adjustment processing unit 60 acquires the information representing a discarded data amount from each SW 40 in a predetermined cycle.

When the adjustment processing unit 60 acquires the information representing a discarded data amount, the adjustment processing unit 60 selects one flow ID out of flow IDs assigned to the L2NW 4. The adjustment processing unit 60 adjusts, for each SW 40, the queue length and the leveling rate of the selected flow ID so that the discarded data amount of each SW 40 becomes 0.

After the adjustment processing unit 60 completes the adjustment of the selected flow ID, the adjustment processing unit 60 selects another flow ID. The adjustment processing unit 60 adjusts, for each SW 40, the queue length and the leveling rate of the selected another flow ID so that the discarded data amount of each SW 40 becomes 0. After the adjustment processing unit 60 completes adjustment of all of the flow IDs in the L2NW 4, the adjustment processing unit 60 transmits information representing the adjusted queue length and leveling rate to each SW 40.

In this manner, even when a microburst occurs in any of the SWs 40 of the L2NW 4, the adjustment processing unit 60 can repeatedly adjust the queue length and the leveling rate in stages so that no data is discarded.

The adjustment processing unit 60 identifies a topology of the L2NW 4 (how the plurality of SWs 40 are connected) for each flow ID. When the adjustment processing unit 60 identifies the topology of the L2NW 4, the adjustment processing unit 60 adjusts the queue length and the leveling rate of each SW 40 for each flow ID.

Processing of Identifying Topology of L2NW 4

The adjustment processing unit 60 acquires, from each SW 40, a transfer route table stored in the SW 40 in a predetermined cycle. The cycle in which the adjustment processing unit 60 acquires the transfer route table and the cycle in which the adjustment processing unit 60 acquires the information representing a discarded data amount may be different cycles. In the transfer route table, a flow ID, a MAC destination address, and an SW being a subsequent destination of a transfer frame are associated with each other. The adjustment processing unit 60 identifies the topology of the L2NW 4 for each flow ID, based on the transfer route table acquired from each SW 40.

Figure 7:
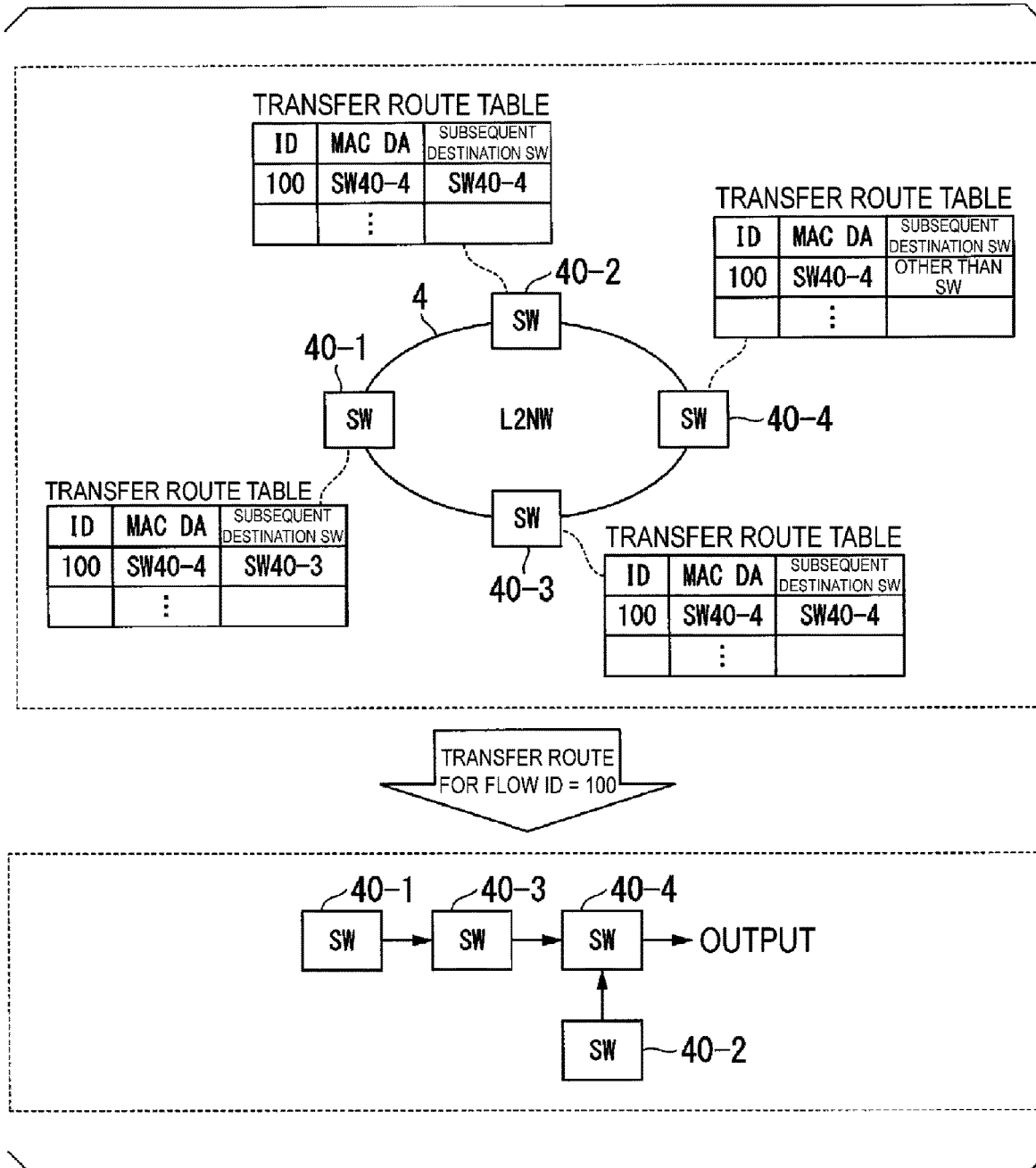
FIG. 7 is a diagram illustrating an example of processing of identifying a topology of a plurality of SWs according to the first embodiment.

FIG. 7 is a diagram illustrating an example of processing of identifying the topology of the plurality of SWs. In FIG. 7, an SW 40 that is not recorded as a "subsequent destination SW" of any of the SWs 40 in the transfer route table is the SW 40 serving as the starting point of the transfer route for the flow ID "100" illustrated in FIG. 7. In the transfer route table, an SW 40 whose "subsequent destination SW" is "other than SW" is the SW 40 serving as the end point of the transfer route for the flow ID "100" illustrated in FIG. 7. An entity that is "other than SW" is an apparatus other than the SW 40, one example of which is the IoT server 5.

The adjustment processing unit 60 detects SWs 40 each serving as the starting point. In the processing of identifying the topology, the adjustment processing unit 60 identifies the topology of the L2NW 4 by tracking the field "subsequent destination SW" of the transfer route table of each SW 40 sequentially from the SW 40 serving as the starting point to the SW 40 serving as the end point. The adjustment processing unit 60 generates a list (hereinafter referred to as a "branch list") showing the SWs 40 that are included in each branch of the identified topology, for each branch and each flow ID.

Figure 8:
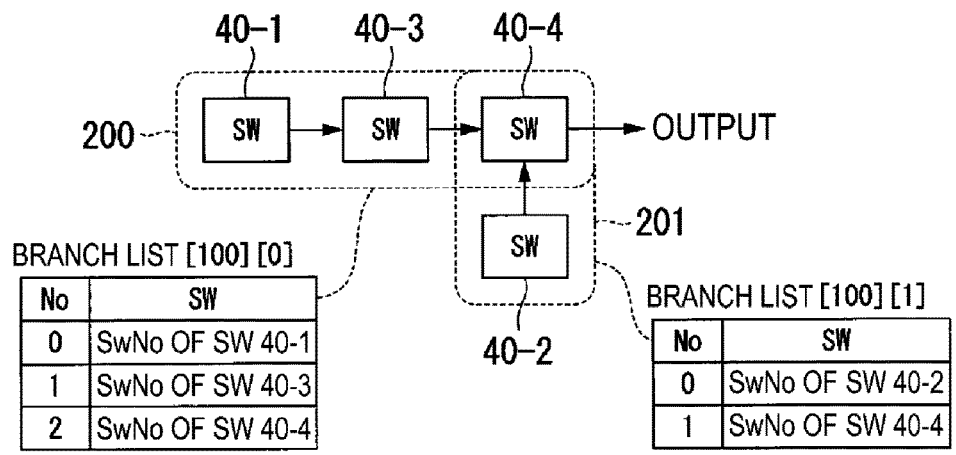
FIG. 8 is a diagram illustrating an example of branch lists of the topology according to the first embodiment.

FIG. 8 is a diagram illustrating an example of branch lists of the topology. In each branch list, a connection number "No" that is assigned to each SW 40 sequentially from the SW 40 farthest from the output side in the branch and an identification number "SwNo" of each SW 40 are associated with each other. The number of branches in the topology of the transfer route for the flow ID "100" illustrated in FIG. 7 is two.

In a branch list [FlowId=100][0] representing a branch 200, the connection number "0" and the SW 40-1 are associated with each other, the connection number "1" and the SW 40-3 are associated with each other, and the connection number "2" and the SW 40-4 are associated with each other. The variable "FlowId" is a variable representing a flow ID. In a branch list [FlowId=100][1] representing a branch 201, the connection number "0" and the SW 40-2 are associated with each other, and the connection number "1" and the SW 40-4 are associated with each other.

Figure 9:
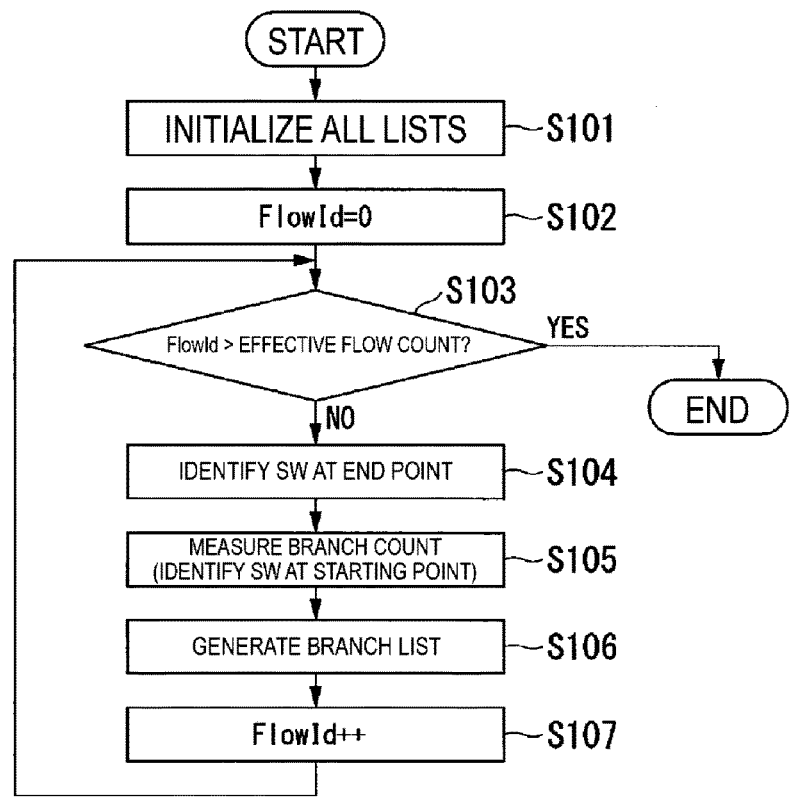
FIG. 9 is a flowchart illustrating an operation example of generating the branch list according to the first embodiment.

FIG. 9 is a flowchart illustrating an operation example of generating the branch list. The adjustment processing unit 60 initializes all of the branch lists (Step S101). The adjustment processing unit 60 initializes the value of "FlowId" to 0, for the sake of generation of branch lists in ascending order from "FlowId=0" (Step S102). The adjustment processing unit 60 determines whether or not the value of "FlowId" is larger than the number of effective flows in the L2NW 4 (hereinafter referred to as an "effective flow count") (Step S103). In accordance with a determination that the value of "FlowId" is larger than the effective flow count (Step S103: YES), the adjustment processing unit 60 ends the processing of generating the branch lists.

In accordance with a determination that the effective flow count is equal to or less than the value of "FlowId" (Step S103: NO), the adjustment processing unit 60 identifies the SW 40 serving as the end point (Step S104). The adjustment processing unit 60 identifies the SW 40 serving as the starting point. The number of branches (hereinafter referred to as a "branch count") is equal to the number of SWs 40 each serving as the starting point in the transfer route assigned the same flow ID. The adjustment processing unit 60 can identify the branch count by identifying the number of SWs 40 each serving as the starting point (Step S105).

The adjustment processing unit 60 selects one SW 40 out of a group of such identified SWs 40 each serving as the starting point. The adjustment processing unit 60 generates the branch list by tracking the field "subsequent destination SW" of the transfer route table of each SW 40 sequentially from the SW 40 serving as the starting point to the SW 40 serving as the end point. The adjustment processing unit 60 generates a branch list for all of the SWs 40 each serving as the starting point (Step S106).

The adjustment processing unit 60 increments the value of "FlowId" (Step S107). The adjustment processing unit 60 causes the processing to return to Step S103. In this manner, the adjustment processing unit 60 can generate as many branch lists as the identified branch count.

Figure 10:
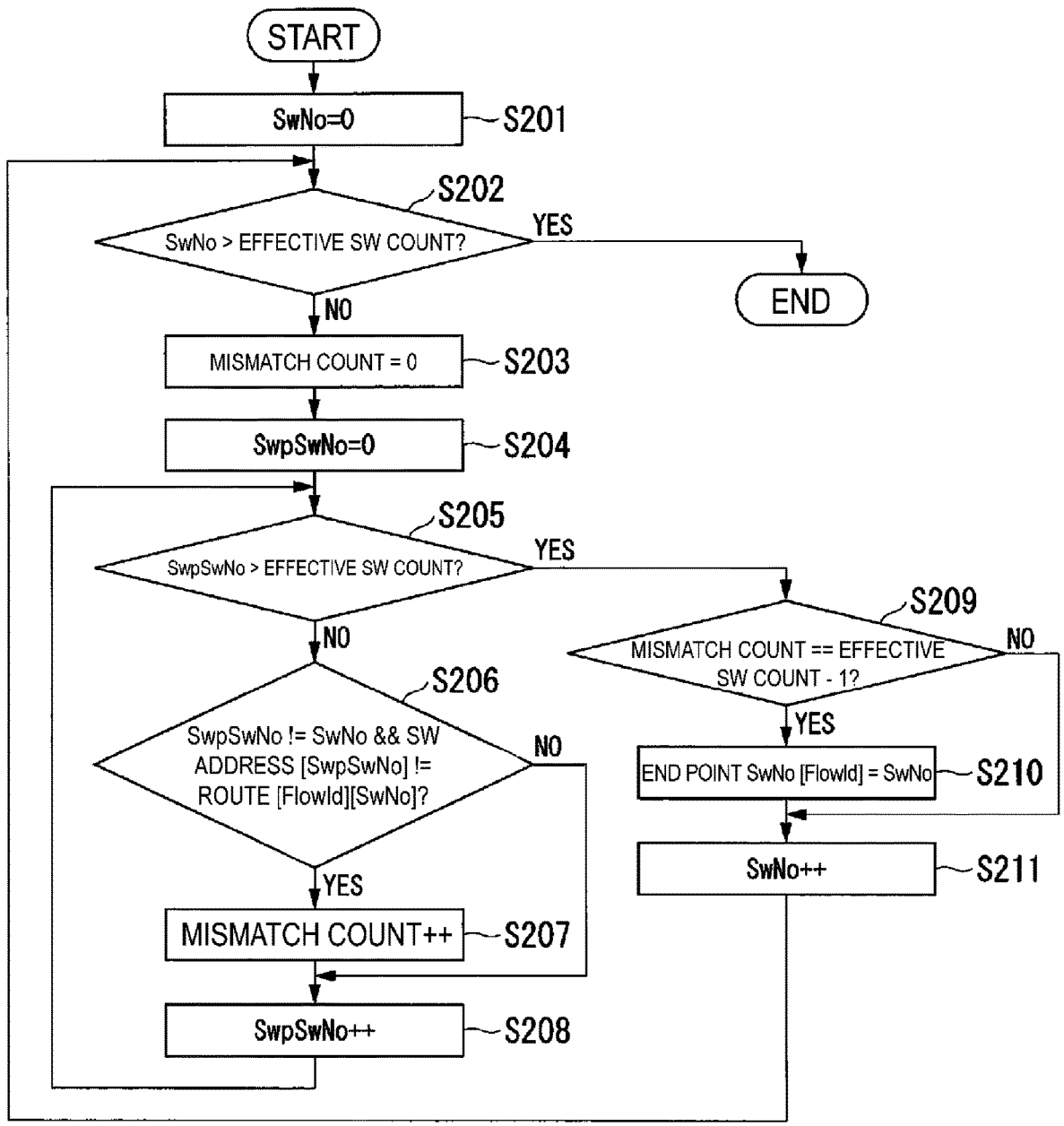
FIG. 10 is a flowchart illustrating details of an operation example of identifying an SW serving as the end point according to the first embodiment.

FIG. 10 is a flowchart illustrating details of an operation example of identifying the SW 40 serving as the end point (Step S104 of FIG. 9). In the field "subsequent destination SW" (=route [FlowId][SwNo]) of the transfer route table of the SW 40 serving as the end point, an apparatus other than the SW 40 connected to the L2NW controller 6 is recorded. For example, in FIG. 7, in the subsequent destination SW" of the transfer route table of the SW 40-4, "other than SW" (for example, the IoT server 5-1) is recorded. The number of SWs 40 connected to the L2NW controller 6 is hereinafter referred to as an "effective SW count".

The adjustment processing unit 60 executes collation processing of determining whether or not the field "subsequent destination SW" of the transfer route table of each SW 40 and "SwNo" of the SW 40 match each other. An SW 40 whose number of times the field "subsequent destination SW" and "SwNo" of the target SW 40 do not match each other (hereinafter referred to as a "mismatch count") is equal to a count value (effective SW count−1) is the SW 40 serving as the end point (=end point SwNo [FlowId]).

The adjustment processing unit 60 initializes the variable "SwNo" to 0 (Step S201). The adjustment processing unit 60 determines whether or not the value of "SwNo" is larger than the effective SW count (Step S202). In accordance with a determination that the value of "SwNo" is larger than the effective SW count (Step S202: YES), the adjustment processing unit 60 ends the processing of identifying the SW 40 serving as the end point.

In accordance with a determination that the value of "SwNo" is equal to or less than the effective SW count (Step S202: NO), the adjustment processing unit 60 initializes the variable "mismatch count" to 0 (Step S203). The adjustment processing unit 60 initializes a variable "SwpSwNo" to 0 (Step S204).

The adjustment processing unit 60 determines whether or not the value of "SwpSwNo" is larger than the effective SW count (Step S205). In accordance with a determination that the value of "SwpSwNo" is larger than the effective SW count (Step S205: YES), the adjustment processing unit 60 causes the processing to proceed to Step S208.

In accordance with a determination that the effective SW count is equal to or less than the value of "SwpSwNo" (Step S205: NO), the adjustment processing unit 60 determines whether or not the variable "SwpSwNo" and the variable "SwNo" are different from each other and an SW address [SwpSwNo] and a route [FlowId][SwNo] are different from each other. The SW address [SwpSwNo] is a value representing an address of the SW 40 having the variable "SwpSwNo". The route [FlowId][SwNo] is the field "subsequent destination SW" of the transfer route table of the SW 40 serving as the end point (Step S206).

In accordance with a determination that the variable "SwpSwNo" and the variable "SwNo" are the same as each other, or the SW address [SwpSwNo] and the route [FlowId][SwNo] are the same as each other (Step S206: NO), the adjustment processing unit 60 causes the processing to proceed to Step S208.

In accordance with a determination that the variable "SwpSwNo" and the variable "SwNo" are different from each other, or the SW address [SwpSwNo] and the route [FlowId][SwNo] are different from each other (Step S206: YES), the adjustment processing unit 60 increments the variable "mismatch count" (Step S207). The adjustment processing unit 60 increments the variable "SwpSwNo" (Step S208). The adjustment processing unit 60 causes the processing to return to Step S205.

The adjustment processing unit 60 determines whether or not the variable "mismatch count" and the count value (effective SW count−1) are equal to each other (Step S209). In accordance with a determination that the variable "mismatch count" and the count value (effective SW count−1) are different from each other (Step S209: NO), the adjustment processing unit 60 causes the processing to proceed to Step S211. In accordance with a determination that the variable "mismatch count" and the count value (effective SW count−1) are equal to each other (Step S209: YES), the adjustment processing unit 60 substitutes the value of the variable "SwNo" into SwNo [FlowId] that stores the identification number of the SW 40 serving as the end point (Step S210). The adjustment processing unit 60 increments the value of the variable "SwNo" (Step S211). The adjustment processing unit 60 causes the processing to return to Step S202.

Figure 11:
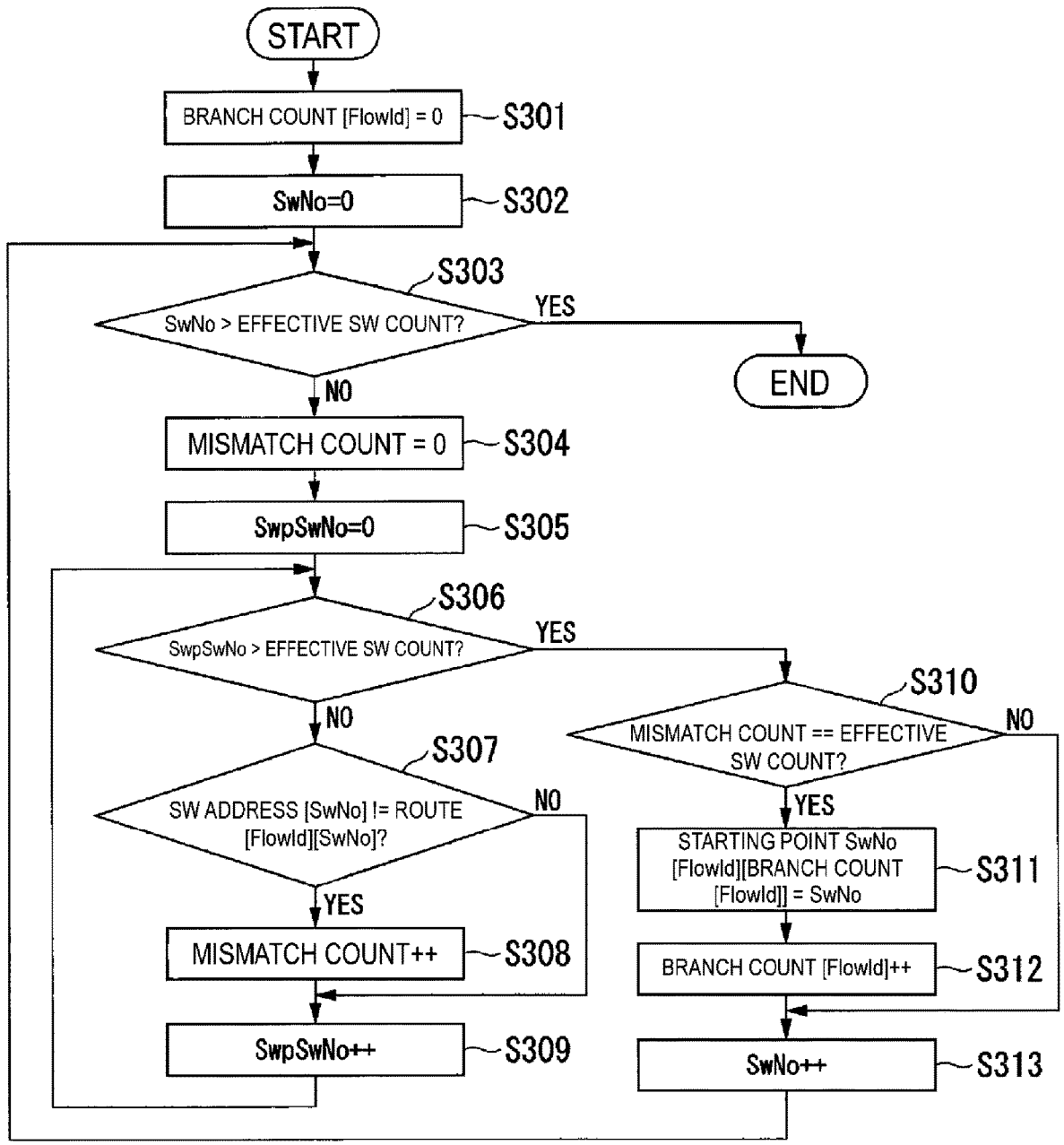
FIG. 11 is a flowchart illustrating details of an operation example of identifying an SW serving as the starting point according to the first embodiment.

FIG. 11 is a flowchart illustrating details of an operation example of identifying the SW 40 serving as the starting point (Step S105 of FIG. 9). The adjustment processing unit 60 executes collation processing of determining whether or not the field "subsequent destination SW" of the transfer route table of each SW 40 and "SwNo" of the SW 40 match each other. An SW 40 whose mismatch count is equal to the effective SW count is the SW 40 serving as the starting point (=starting point SwNo [FlowId][branch count [FlowId]]).

The adjustment processing unit 60 initializes the value of the branch count [FlowId] to 0 (Step S301). The adjustment processing unit 60 initializes the value of the variable "SwNo" to 0 (Step S302).

The adjustment processing unit 60 determines whether or not the value of "SwpNo" is larger than the effective SW count (Step S303). In accordance with a determination that the value of "SwpNo" is larger than the effective SW count (Step S303: YES), the adjustment processing unit 60 ends the processing of identifying the SW 40 serving as the starting point.

In accordance with a determination that the effective SW count is equal to or less than the value of "SwpNo" (Step S303: NO), the adjustment processing unit 60 initializes the variable "mismatch count" to 0 (Step S304). The adjustment processing unit 60 initializes the variable "SwpSwNo" to 0 (Step S305).

The adjustment processing unit 60 determines whether or not the value of "SwpSwNo" is larger than the effective SW count (Step S306). In accordance with a determination that the value of "SwpSwNo" is larger than the effective SW count (Step S306: YES), the adjustment processing unit 60 causes the processing to proceed to Step S310.

In accordance with a determination that the effective SW count is equal to or less than the value of "SwpSwNo" (Step S306: NO), the adjustment processing unit 60 determines whether or not the SW address [SwpNo] and the route [FlowId][SwNo] are different from each other (Step S307). In accordance with a determination that the SW address [SwpSwNo] and the route [FlowId][SwNo] are the same as each other (Step S307: NO), the adjustment processing unit 60 causes the processing to proceed to Step S309.

In accordance with a determination that the SW address [SwpNo] and the route [FlowId][SwNo] are different from each other (Step S307: YES), the adjustment processing unit 60 increments the variable "mismatch count" (Step S308). The adjustment processing unit 60 increments the variable "SwpSwNo" (Step S309). The adjustment processing unit 60 causes the processing to return to Step S306.

The adjustment processing unit 60 determines whether or not the variable "mismatch count" and the effective SW count are equal to each other (Step S310). In accordance with a determination that the variable "mismatch count" and the effective SW count are different from each other (Step S310: NO), the adjustment processing unit 60 causes the processing to proceed to Step S313. In accordance with a determination that the variable "mismatch count" and the effective SW count are equal to each other (Step S310: YES), the adjustment processing unit 60 substitutes the value of the variable "SwpNo" into the starting point SwNo [FlowId][branch count [FlowId]] (Step S311).

The adjustment processing unit 60 increments the value of the branch count [FlowId](Step S312). The adjustment processing unit 60 increments the value of the variable "SwNo" (Step S313). The adjustment processing unit 60 causes the processing to return to Step S303.

Figure 12:
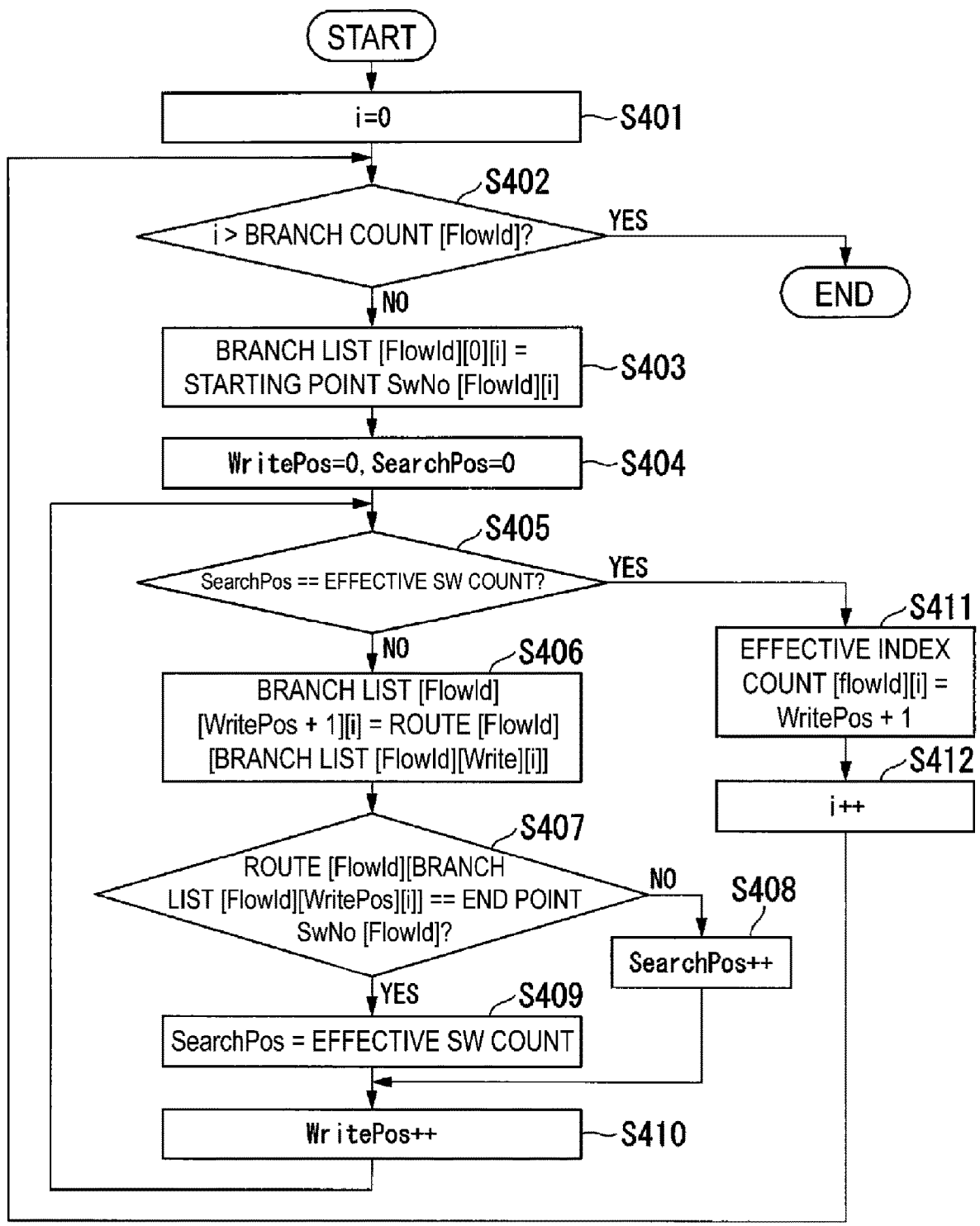
FIG. 12 is a flowchart illustrating an operation example of generating the branch list based on the identified SW serving as the starting point and the identified SW serving as the end point according to the first embodiment.

FIG. 12 is a flowchart illustrating an operation example of generating a branch list, based on the identified SW 40 serving as the starting point and the identified SW 40 serving as the end point (Step S106 of FIG. 9). The number of effective indexes (effective range) in a branch list is hereinafter referred to as an "effective index count". The adjustment processing unit 60 initializes the value of a variable i to 0 (Step S401). Whether or not the value of the variable i is larger than the value of the branch count [FlowId] is determined (Step S402). In accordance with a determination that the value of the variable i is larger than the branch count [FlowId] (Step S402: YES), the adjustment processing unit 60 ends the processing of generating a branch list.

In accordance with a determination that the value of the variable i is equal to or less than the value of the branch count [FlowJd] (Step S402: NO), the adjustment processing unit 60 substitutes the value of a starting point SwNo [FlowId][i] into a branch list [FlowId][0][i](Step S403). The adjustment processing unit 60 initializes the value of a variable "WritePos" representing a writing position to 0. The adjustment processing unit 60 initializes the value of a variable "SearchPos" representing a search position to 0 (Step S404).

The adjustment processing unit 60 determines whether or not the value of the variable "SearchPos" and the effective SW count are equal to each other (Step S405). In accordance with a determination that the value of the variable "SearchPos" and the effective SW count are equal to each other (Step S405: YES), the adjustment processing unit 60 causes the processing to proceed to Step S411. In accordance with a determination that the value of the variable "SearchPos" and the effective SW count are different from each other (Step S405: NO), the adjustment processing unit 60 substitutes the value of a route [FlowId][branch list [FlowId][Write][i]] to a branch list [FlowId][WritePos+1][i] (Step S406).

The adjustment processing unit 60 determines whether or not the value of a route [FlowId][branch list [FlowId][WritePos][i] and the value of the end point SwNo [FlowId] are equal to each other (Step S407). In accordance with a determination that the value of the route [FlowId][branch list [FlowId][WritePos][i] and the value of the end point SwNo [FlowId] are different from each other (Step S407: NO), the adjustment processing unit 60 increments the value of the variable "SearchPos" (Step S408).

In accordance with a determination that the value of the route [FlowId][branch list [FlowId][WritePos][i] and the value of the end point SwNo [FlowId] are equal to each other (Step S407: YES), the adjustment processing unit 60 substitutes the effective SW count into the value of the variable "SearchPos" (Step S409). The adjustment processing unit 60 increments the value of the variable "WritePos" (Step S410). The adjustment processing unit 60 causes the processing to return to Step S405.

The adjustment processing unit 60 substitutes the value of the variable "WritePos"+1 into an effective index count [flowld][i] (Step S411). The adjustment processing unit 60 increments the value of the variable i (Step S412). The adjustment processing unit 60 causes the processing to return to Step S402.

Processing of Adjusting Queue Length and Leveling Rate of Each SW 40

The adjustment processing unit 60 adjusts the queue length and the leveling rate of each SW 40 sequentially from the SW 40 serving as the starting point to the SW 40 serving as the end point, based on the branch list that is generated through the processing of identifying the topology of the L2NW 4.

Figure 13:
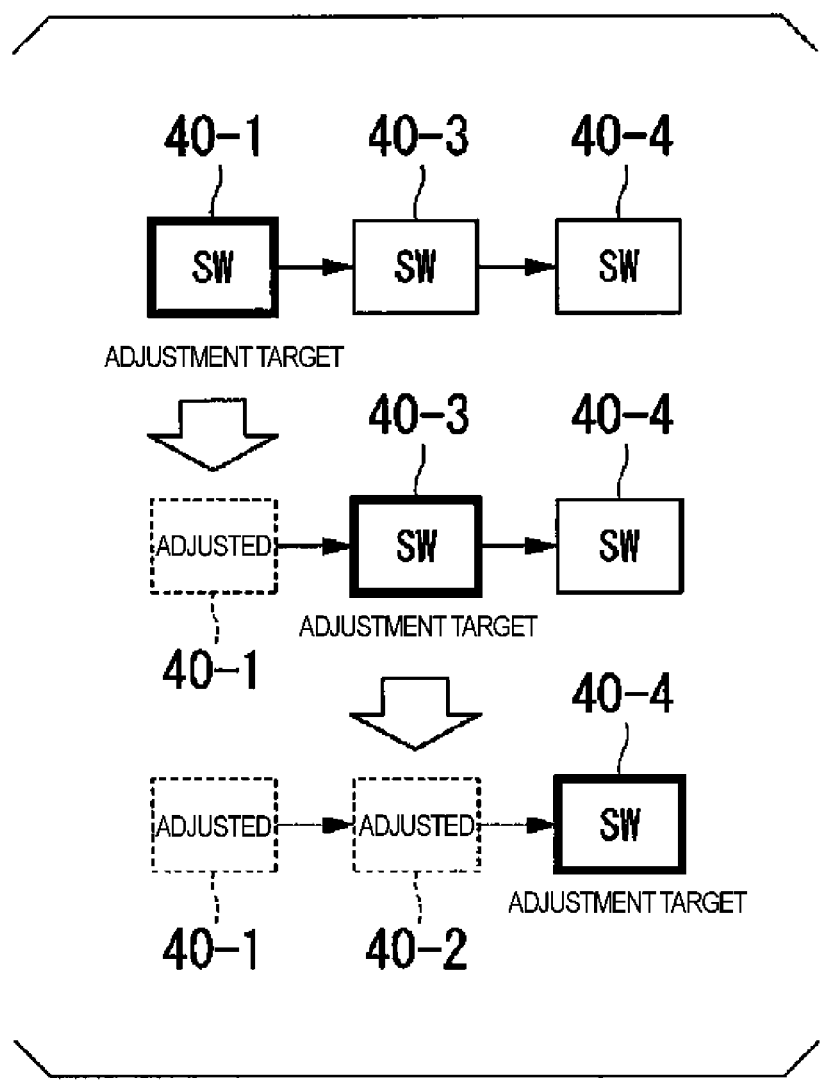
FIG. 13 is a diagram illustrating an example of an SW being an adjustment target according to the first embodiment.

FIG. 13 is a diagram illustrating an example of an SW being an adjustment target. The adjustment processing unit 60 acquires information representing a discarded data amount from the SW 40-1 being the SW serving as the starting point (first SW) of the branch 200 illustrated in FIG. 8. The adjustment processing unit 60 determines whether or not there is a discarded data amount in the SW 40-1.

If there is a discarded data amount in the SW 40-1, the adjustment processing unit 60 determines a data amount of data to be stored in the SW 40-1 being an adjustment target out of the discarded data. The adjustment processing unit 60 determines the queue length of the queue 410-1 and the leveling rate of data transmitted from the transmission unit 420-1, based on the data amount of the data to be stored in the SW 40-1. The adjustment processing unit 60 adds a data amount of the data that is not to be stored in the SW 40-1 out of the discarded data amount of the SW 40-1 to the discarded data amount of the SW 40-3 being the second SW of the branch 200. The adjustment processing unit 60 repeats the processing of adding a data amount of data to be stored in each SW 40 of the branch 200 until the processing is finally performed on the end (the SW 40-4 serving as the end point) of the branch list of the branch 200.

After the adjustment processing unit 60 completes the adjustment of the queue length and the leveling rate at the end of the branch list, the adjustment processing unit 60 also adjusts the queue length and the leveling rate of each SW 40 of the next branch list (branch 201) in a similar manner. After the adjustment processing unit 60 completes the processing of adjusting the queue length and the leveling rate of each SW 40 of all of the branch lists, the adjustment processing unit 60 ends the processing of making adjustments for the flow ID of the transfer route including the branch 200 and the branch 201. The adjustment processing unit 60 also adjusts the queue length and the leveling rate of each SW 40 for other flow IDs in a similar manner. The adjustment processing unit 60 adjusts the queue length and the leveling rate of each SW 40 for all of the flow IDs.

Figure 14:
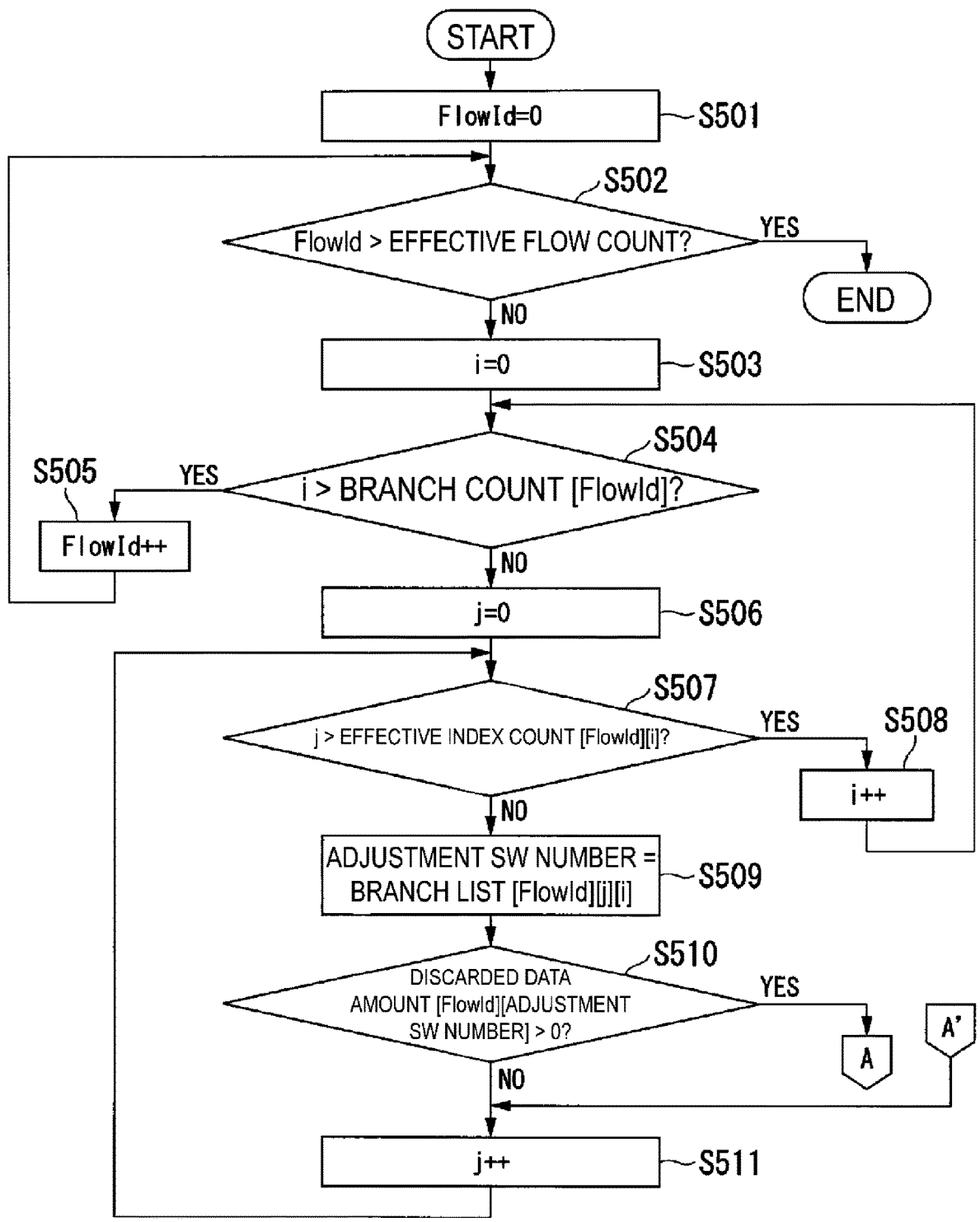
FIG. 14 is a flowchart illustrating an operation example of adjusting the queue length and the leveling rate according to the first embodiment.

FIG. 14 is a flowchart illustrating an operation example of adjusting the queue length and the leveling rate. The letters and numbers illustrated in the proceeding direction of determination processing in the following flowcharts indicate that the process proceeds to processing of a step denoted by the same letter or number. For example, the letter "A" illustrated in the proceeding direction of determination processing of Step S502 of FIG. 14 indicates that the process proceeds to processing of Step S512 denoted by "A" being the same letter in FIG. 15.

The adjustment processing unit 60 initializes the value of the variable "FlowId" to 0 (Step S501). The adjustment processing unit 60 determines whether or not the value of "FlowId" is larger than the effective flow count (Step S502). In accordance with a determination that the value of "FlowId" is larger than the effective flow count (Step S502: YES), the adjustment processing unit 60 ends the processing of adjusting the queue length and the leveling rate.

In accordance with a determination that the effective flow count is equal to or less than the value of "FlowId" (Step S502: NO), the adjustment processing unit 60 initializes the value of the variable i representing a number of the branch to 0 (Step S503). The adjustment processing unit 60 determines whether or not the value of the variable i is larger than the value of the branch count [FlowId] (Step S504). In accordance with a determination that the value of the variable i is larger than the value of the branch count [FlowId] (Step S504: YES), the adjustment processing unit 60 increments the value of the variable "FlowId" (Step S505).

In accordance with a determination that the value of the variable i is equal to or less than the value of the branch count [FlowId] (Step S504: NO), the adjustment processing unit 60 initializes the value of a variable j representing an effective index in the branch list to 0—(Step S506). The adjustment processing unit 60 determines whether or not the value of the variable j is larger than the value of the effective index count [FlowId][i] (Step S507). In accordance with a determination that the value of the variable j is larger than the value of the effective index count [FlowId][i] (Step S507: YES), the adjustment processing unit 60 increments the value of the variable i (Step S508).

In accordance with a determination that the value of the variable j is equal to or less than the value of the effective index count [FlowId] [i] (Step S507: NO), the adjustment processing unit 60 substitutes the value of a branch list [FlowId][j][i] into a variable "adjustment SW number" representing a number of the SW 40 being an adjustment target (Step S509). The adjustment processing unit 60 determines whether or not to adjust the queue length and the leveling rate of the SW 40 indicated by the variable "adjustment SW number". In other words, the adjustment processing unit 60 determines whether or not the value of a discarded data amount [FlowId][adjustment SW number] is larger than 0 (whether or not there is a discarded data amount) (Step S510). In accordance with a determination that the value of the discarded data amount [FlowId][adjustment SW number] is 0 (Step S510: NO), the adjustment processing unit 60 increments the value of the variable j (Step S511). The adjustment processing unit 60 causes the processing to return to Step S507.

Figure 15:
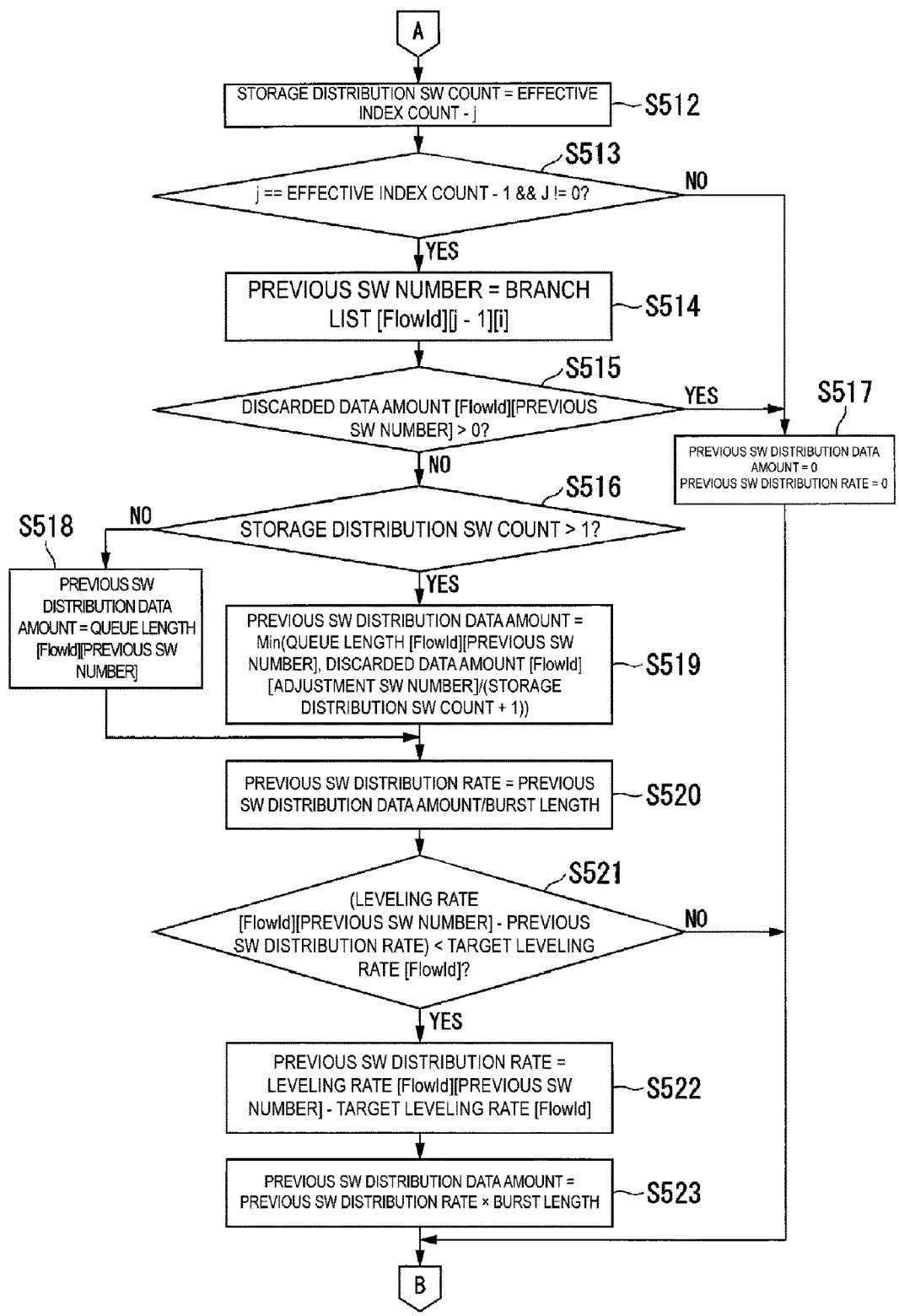
FIG. 15 is a first part of a flowchart illustrating details of an operation example of adjusting the queue length and the leveling rate according to the first embodiment.

FIG. 15 is a first part of a flowchart illustrating details of an operation example of adjusting the queue length and the leveling rate (processing of determining a data amount of data to be stored in a group of SWs 40 at a previous stage in a distributed manner out of the discarded data amount).

When the SW 40 being an adjustment target is the SW 40 serving as the end point, the discarded data amount exceeds 0, and there is no discarded data amount in the SWs 40 at a previous stage, the adjustment processing unit 60 causes the group of SWs 40 at the previous stage to store data in a distributed manner. When the SW 40 being an adjustment target is the SW 40 other than the end point, the adjustment processing unit 60 causes a group of SWs 40 at a subsequent or later stage to store data in a distributed manner without causing the group of SWs 40 at the previous stage to store the data.

A variable "storage distribution SW count" represents the number of SWs 40 at a subsequent stage that can distribute data of the discarded data amount, with respect to the SW 40 being an adjustment target (the SW 40 indicated by the adjustment SW number). A variable "burst length" represents a predetermined expected value of a microburst length, and is 1 ms, for example. A variable "previous SW number" represents an identification number of the SW 40 at a previous stage. A variable "subsequent SW number" represents an identification number of the SW 40 at a stage subsequent to the SW 40 being an adjustment target.

A variable "target SW adjustment data amount" represents a value that is added to the queue length of the queue 410 associated with a flow of the adjustment target in the SW 40 indicated by the adjustment SW number. A variable "previous SW distribution data amount" represents a data amount of data to be stored in a group of SWs 40 at a previous stage in a distributed manner out of the discarded data amount. A variable "subsequent SW distribution data amount" represents a data amount of data to be stored in a group of other SWs 40 at a subsequent or later stage in a distributed manner out of the discarded data amount.

A variable "target SW adjustment rate" represents a value that is added to the leveling rate (output data rate) of data transmitted from the transmission unit 420 associated with a flow of the adjustment target in the SW 40 indicated by the adjustment SW number. A variable "previous SW distribution rate" represents a value that is subtracted from the leveling rate (output data rate) of data transmitted from the SW 40 at a previous stage. A variable "line rate" represents a maximum data rate of an output port of the SW 40.

In accordance with a determination that the value of the discarded data amount [FlowId][adjustment SW number] is larger than 0 (Step S510: YES), the adjustment processing unit 60 substitutes the value of (effective index count−j) into the variable "storage distribution SW count" (Step S512). The adjustment processing unit 60 determines whether or not the SW 40 being an adjustment target is the SW 40 serving as the end point. In other words, the adjustment processing unit 60 determines whether or not the value of (effective index count−j) is equal to the value of the variable j and the value of the variable j is other than 0 (Step S513). With this configuration, the SW 40 serving as the end point can store data in the SWs 40 at the previous stage in a distributed manner.

In accordance with a determination that the value of (effective index count−j) is equal to the value of the variable j and the value of the variable j is other than 0 (Step S513: YES), the adjustment processing unit 60 substitutes the value of a branch list [FlowId][j−1][i] into the variable "previous SW number" (Step S514). The adjustment processing unit 60 determines whether or not the discarded data amount [FlowId][previous SW number] is larger than 0 (whether or not there is a discarded data amount in the SW 40 indicated by the previous SW number) (Step S515).

In accordance with a determination that the discarded data amount [FlowId][previous SW number] is 0 (there is no discarded data amount in the SW 40 indicated by the previous SW number) (Step S515: NO), whether or not the value of the variable "storage distribution SW count" is larger than 1 is determined (Step S516).

In accordance with a determination that the value of (effective index count−j) is different from the value of the variable j or the value of the variable j is 0 (Step S513: NO), or in accordance with a determination that the discarded data amount [FlowId][previous SW number] is larger than 0 (Step S515: YES), the adjustment processing unit 60 substitutes 0 into the variable "previous SW distribution data amount" and substitutes 0 into the variable "previous SW distribution rate" (Step S517).

In accordance with a determination that the value of the variable "storage distribution SW count" is equal to or less than 1 (Step S516: NO), the adjustment processing unit 60 substitutes the value of a queue length [FlowId][previous SW number] into the variable "previous SW distribution data amount" (Step S518). The adjustment processing unit 60 causes the processing to proceed to Step S520.

In accordance with a determination that the value of the variable "storage distribution SW count" is larger than 1 (Step S516: YES), the adjustment processing unit 60 substitutes the value of Min(queue length [FlowId][previous SW number], discarded data amount [FlowId][adjustment SW number]/(storage distribution SW count+1)) into the variable "previous SW distribution data amount" (Step S519). The adjustment processing unit 60 substitutes the value of (previous SW distribution data amount/burst length) into the variable "previous SW distribution rate" (Step S520).

The adjustment processing unit 60 determines whether or not the value of (leveling rate [FlowId][previous SW number]−previous SW distribution rate) is smaller than the value of a target leveling rate [FlowId] (Step S521). In accordance with a determination that the value of (leveling rate [FlowId] [previous SW number]−previous SW distribution rate) is smaller than the value of the target leveling rate [FlowId] (Step S521: YES), the adjustment processing unit 60 substitutes the value of (leveling rate [FlowId][previous SW number]-target leveling rate [FlowId]) into the variable "previous SW distribution rate" (Step S522). The adjustment processing unit 60 substitutes the value of (previous SW distribution rate×burst length) into the variable "previous SW distribution data amount" (Step S523).

Figure 16:
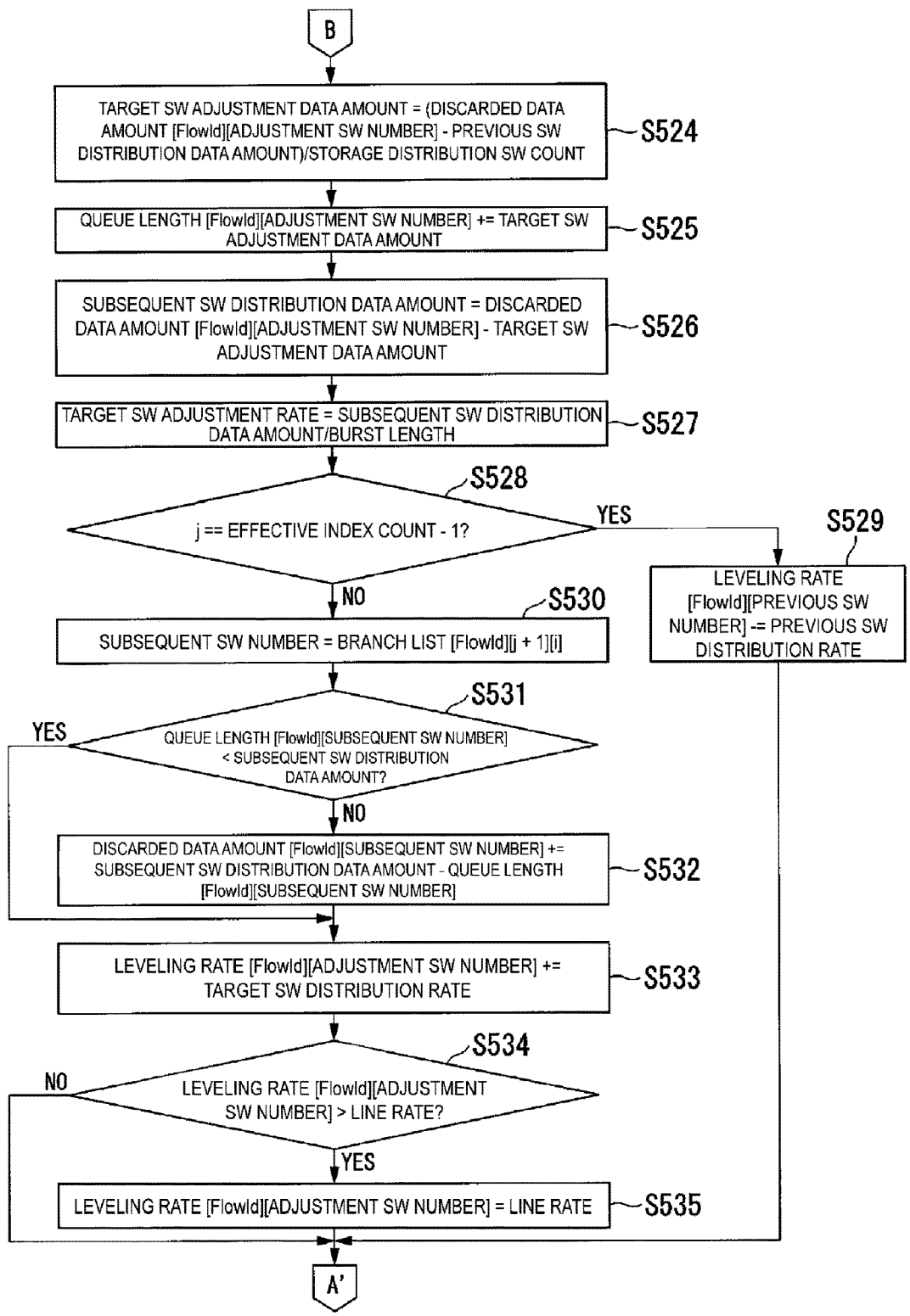
FIG. 16 is a second part of the flowchart illustrating the details of the operation example of adjusting the queue length and the leveling rate according to the first embodiment.

FIG. 16 is a second part of the flowchart illustrating the details of the operation example of adjusting the queue length and the leveling rate (processing of determining a data amount of data to be stored in the target SW 40 and a data amount of data to be stored in a group of other SWs 40 in a distributed manner out of the discarded data amount).

If the processing of Step S517 or Step S523 illustrated in FIG. 15 is executed or in accordance with a determination that the value of (leveling rate [FlowId][previous SW number]−previous SW distribution rate) is equal to or larger than the value of the target leveling rate [FlowId] (Step S521: NO), the adjustment processing unit 60 substitutes the value of (discarded data amount [FlowId][adjustment SW number]−previous SW distribution data amount)/storage distribution SW count) into the variable "target SW adjustment data amount" (Step S524).

The adjustment processing unit 60 adds the value of the variable "target SW adjustment data amount" to the value of a queue length [FlowId][adjustment SW number] (Step S525). The adjustment processing unit 60 substitutes the value of (discarded data amount [FlowId][adjustment SW number]−target SW adjustment data amount) into the variable "subsequent SW distribution data amount" (Step S526). The adjustment processing unit 60 substitutes the value of (subsequent SW distribution data amount/burst length) into the variable "target SW adjustment rate" (Step S527).

The adjustment processing unit 60 determines whether or not the value of the variable j and the value of (effective index count−1) are equal to each other (Step S528). In accordance with a determination that the value of the variable j and the value of (effective index count−1) are equal to each other (Step S528: YES), the adjustment processing unit 60 subtracts the value of the variable "previous SW distribution rate" from the value of the leveling rate [FlowId][previous SW number] (Step S529). In accordance with a determination that the value of the variable j and the value of (effective index count−1) are different from each other (Step S528: NO), the adjustment processing unit 60 substitutes the value of a branch list [FlowId][U+1][i] into the variable "subsequent SW number" (Step S530).

The adjustment processing unit 60 determines whether or not the value of a queue length [FlowId][subsequent SW number] is smaller than the value of the variable "subsequent SW distribution data amount" (Step S531). In accordance with a determination that the value of the queue length [FlowId][subsequent SW number] is smaller than the value of the variable "subsequent SW distribution data amount" (Step S531: YES), the adjustment processing unit 60 causes the processing to proceed to Step S533.

In accordance with a determination that the value of the queue length [FlowId][subsequent SW number] is equal to or larger than the value of the variable "subsequent SW distribution data amount" (Step S531: NO), the adjustment processing unit 60 adds the value of (subsequent SW distribution data amount−queue length [FlowId][subsequent SW number]) to the value of a discarded data amount [FlowId][subsequent SW number] (Step S532). The adjustment processing unit 60 adds the value of a variable "target SW distribution rate" to the value of a leveling rate [FlowId] [adjustment SW number] (Step S533).

The adjustment processing unit 60 determines whether or not the value of the leveling rate [FlowId][adjustment SW number] is larger than the value of the variable "line rate" (Step S534). In accordance with a determination that the value of the leveling rate [FlowId][adjustment SW number] is equal to or less than the value of the variable "line rate" (Step S534: NO), the adjustment processing unit 60 causes the processing to proceed to Step S511 illustrated in FIG. 14. In accordance with a determination that the value of the leveling rate [FlowId][adjustment SW number] is larger than the value of the variable "line rate" (Step S534: YES), the adjustment processing unit 60 substitutes the value of the variable "line rate" into the leveling rate [FlowId][adjustment SW number] (Step S535).

As described above, the communication control system 1 according to the first embodiment includes the plurality of SWs 40 and the NW controller 6 (control apparatus). Each of the SWs 40 includes the queues 410 and the transmission unit 420. Each of the queues 410 is a buffer having a queue length that can be adjusted for each transfer route of data. The transmission unit 420 transmits data stored in the queue for each transfer route to a subsequent destination of the data at a data rate that can be adjusted for each transfer route. The NW controller 6 includes the adjustment processing unit 60. The adjustment processing unit 60 acquires information representing a discarded data amount from the SW 40 that has discarded data. The adjustment processing unit 60 adjusts (determines), for each transfer route, the queue length and the data rate of each SW 40, based on the discarded data amount.

With this configuration, the communication control system 1 according to the first embodiment can level out a microburst without providing a large-capacity buffer in each SW. The communication control system 1 according to the first embodiment can reduce costs for constructing the L2NW. The SW 40 serving as the end point in the transfer route can store data in the SWs 40 at a previous stage in a distributed manner.

The adjustment processing unit 60 acquires, from each SW 40, a transfer route data table including subsequent destination information (subsequent destination SW) being information representing a subsequent destination. The adjustment processing unit 60 identifies the SW 40 serving as the starting point and the SW 40 serving as the end point in the transfer route, based on each piece of the subsequent destination information. The adjustment processing unit 60 identifies the transfer route by tracking each piece of the subsequent destination information sequentially from the transfer route data table acquired from the SW 40 serving as the starting point to the transfer route data table acquired from the SW 40 serving as the end point.

The adjustment processing unit 60 determines, for each transfer route, whether or not the SW 40 that has discarded data is present, based on the discarded data amount. If the SW 40 that has discarded data is present, in the transfer route, the adjustment processing unit 60 adjusts, for each transfer route, the queue length and the data rate so that the data of the discarded data amount is stored in a distributed manner in each of the SWs 40 at a subsequent stage with respect to the SW 40 that has discarded the data and the SW 40 that has discarded the data.

Second Embodiment

The second embodiment is different from the first embodiment in its processing of adjusting the queue length and the leveling rate for causing a group of SWs 40 to store data of a discarded data amount in a distributed manner. In the second embodiment, the difference from the first embodiment will be described.

Figure 17:
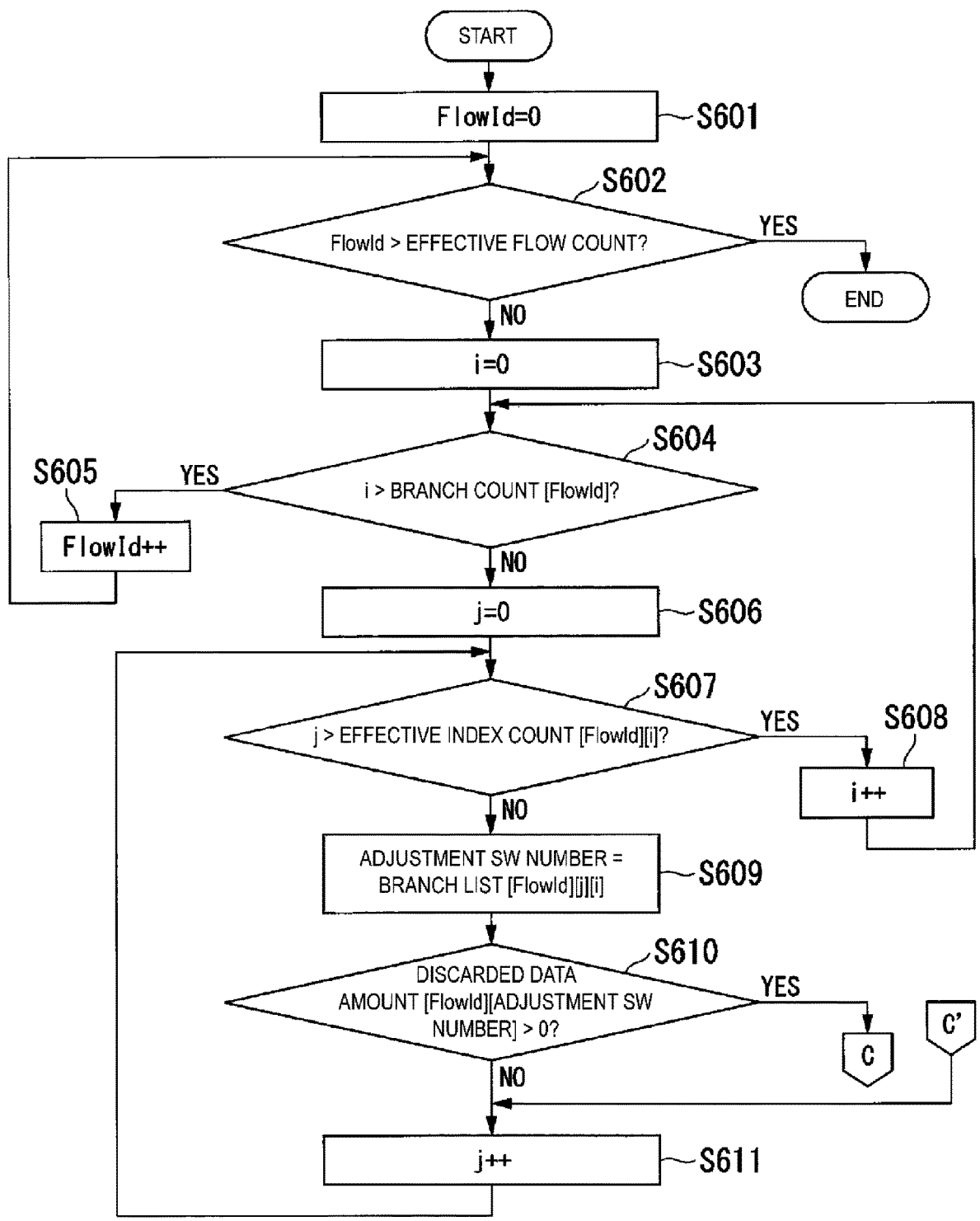
FIG. 17 is a flowchart illustrating an operation example of adjusting the queue length and the leveling rate according to a second embodiment.

FIG. 17 is a flowchart illustrating an operation example of adjusting the queue length and the leveling rate. The operation from Step S601 to Step S611 is similar to the operation from Step S501 to Step S511 illustrated in FIG. 14.

Figure 18:
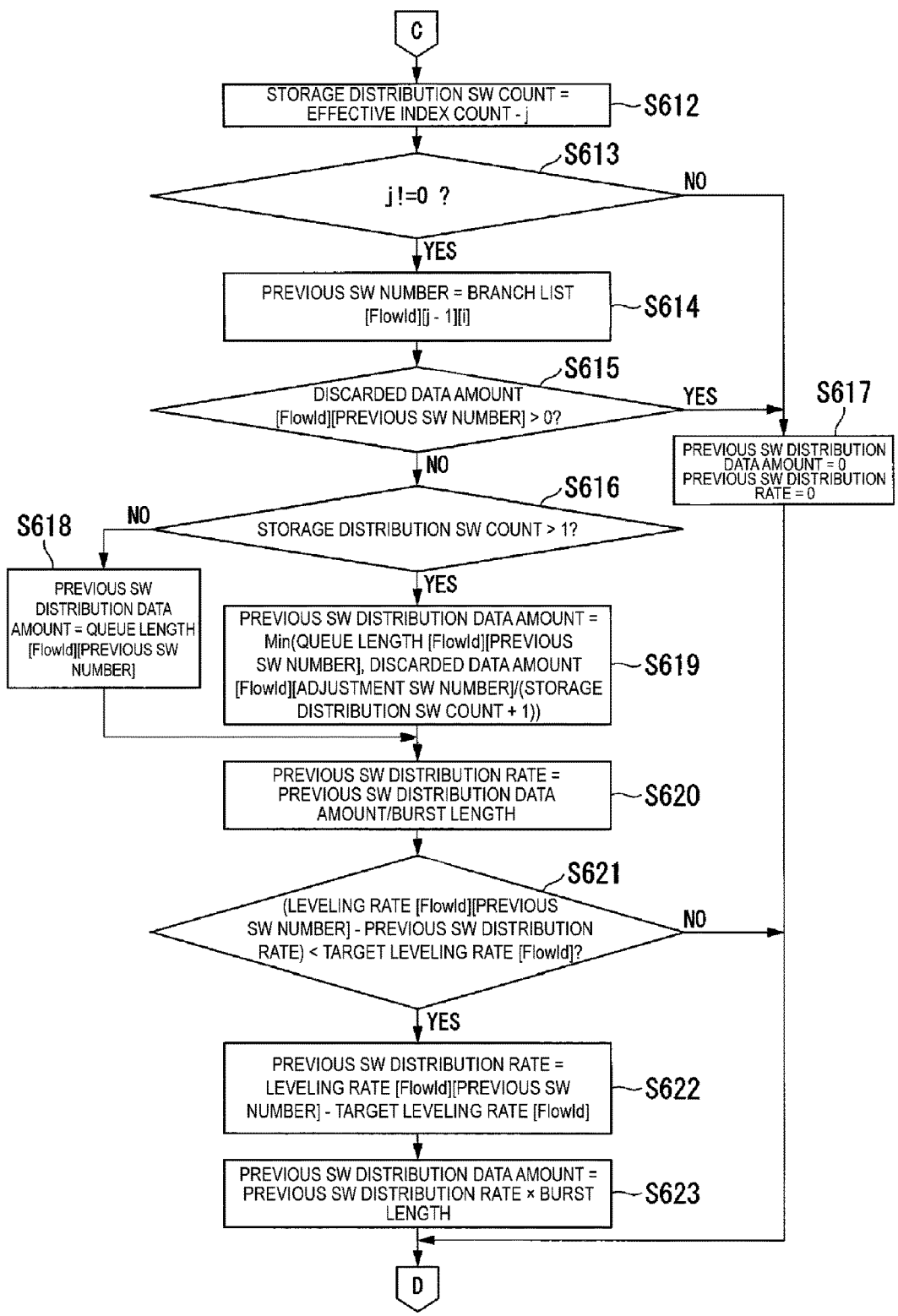
FIG. 18 is a first part of a flowchart illustrating details of an operation example of adjusting the queue length and the leveling rate according to the second embodiment.

FIG. 18 is a first part of a flowchart illustrating details of an operation example of adjusting the queue length and the leveling rate (processing of determining a data amount of data to be stored in a group of SWs 40 at a previous stage in a distributed manner out of the discarded data amount). The operation of Step S612 is similar to the operation of Step S512 illustrated in FIG. 15. The adjustment processing unit 60 determines whether or not the value of the variable j is other than 0 without determining whether or not the SW 40 being an adjustment target is the SW 40 serving as the end point (Step S613).

Owing to the configuration in which the adjustment processing unit 60 does not determine whether or not the SW 40 being an adjustment target is the SW 40 serving as the end point, all of the SWs 40 other than the SW 40 serving as the starting point in the transfer route can store data of the SWs 40 at a previous stage in a distributed manner. The operation from Step S614 to Step S623 is similar to the operation from Step S514 to Step S523 illustrated in FIG. 15.

Figure 19:
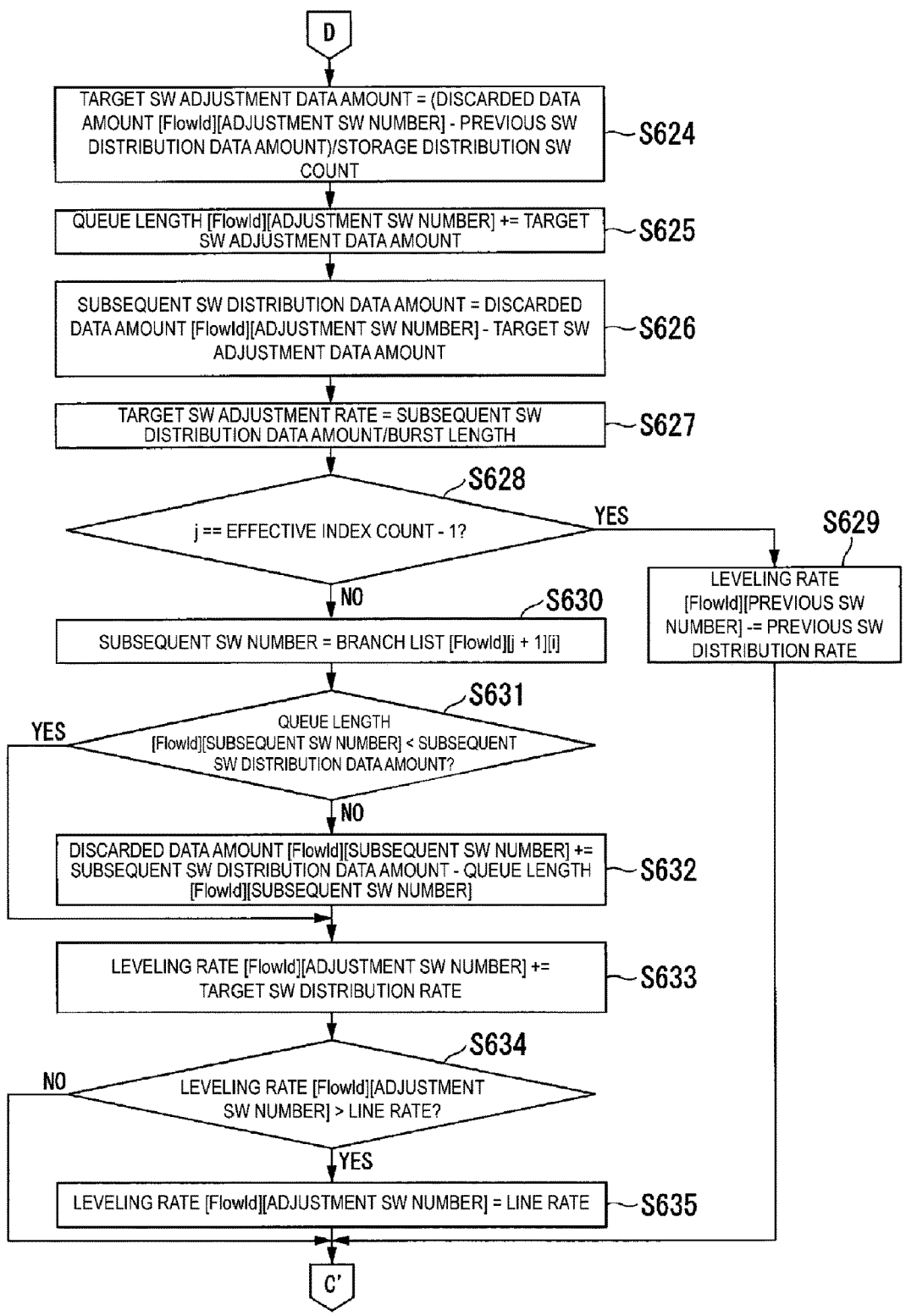
FIG. 19 is a second part of the flowchart illustrating the details of the operation example of adjusting the queue length and the leveling rate according to the second embodiment.
Figure 20:
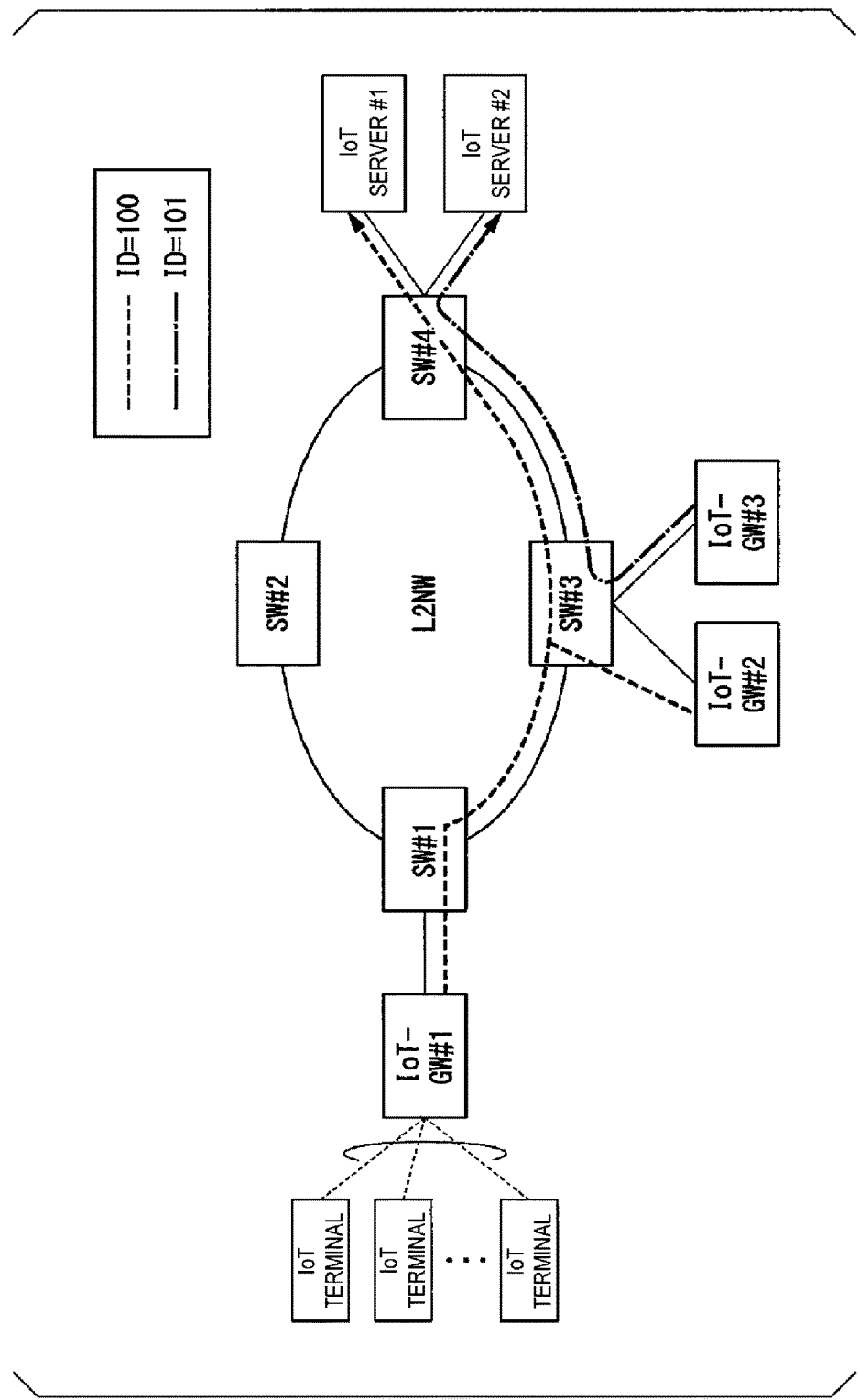
FIG. 20 is a diagram illustrating a configuration example of a communication control system of related art.

FIG. 19 is a second part of the flowchart illustrating the details of the operation example of adjusting the queue length and the leveling rate (processing of determining a data amount of data to be stored in the target SW 40 and a data amount of data to be stored in a group of other SWs 40 in a distributed manner out of the discarded data amount). The operation from Step S624 to Step S635 is similar to the operation from Step S524 to Step S535 illustrated in FIG. 16.

As described above, the adjustment processing unit 60 according to the second embodiment determines, for each transfer route, whether or not the SW 40 that has discarded data is present, based on the discarded data amount. If the SW 40 that has discarded data is present, in the transfer route, the adjustment processing unit 60 adjusts, for each transfer route, the queue length and the data rate so that the data of the discarded data amount is stored in a distributed manner in each of the SWs 40 other than the SW 40 serving as the starting point.

With this configuration, the communication control system 1 according to the second embodiment can level out a microburst without providing a large-capacity buffer in each SW. The communication control system 1 can store data of the SWs 40 at a previous stage in a distributed manner in all of the SWs 40 other than the SW 40 serving as the starting point in the transfer route.

The embodiments of the present invention have been described above in detail with reference to the drawings. However, specific configurations are not limited to those embodiments, and include any design or the like within the scope not departing from the gist of the present invention.

The IoT terminal, the IoT server, the IoTGW, the NW controller, and the SW in the embodiments described above may be implemented by using a computer. In such a case, the IoT terminal, the IoT server, the IoTGW, the NW controller, and the SW may be implemented by recording a program for implementing their functions in a computer-readable recording medium, and causing a computer system to read and execute the program recorded in the recording medium. Note that the "computer system" as used herein includes an OS and hardware such as a peripheral device. The "computer-readable recording medium" refers to a portable medium such as a flexible disk, a magneto-optical disk, a ROM, and a CD-ROM, and a storage apparatus such as a hard disk installed in a computer system. Further, the "computer-readable recording medium" may also include such a medium that stores programs dynamically for a short period of time, one example of which is a communication line used when a program is transmitted via a network such as the Internet and a communication line such as a telephone line, and may also include such a medium that stores programs for a certain period of time, one example of which is volatile memory inside a computer system that functions as a server or a client in the above-described case. Further, the above program may be a program for implementing a part of the above-mentioned functions. The above program may be a program capable of implementing the above-mentioned functions in combination with another program already recorded in a computer system. The above program may be a program to be implemented with the use of a programmable logic device such as a field programmable gate array (FPGA).

INDUSTRIAL APPLICABILITY

The present invention can be applied to a communication system for IoT.

REFERENCE SIGNS LIST

1 . . . Communication control system
2 . . . IoT terminal
3 . . . IoT-GW
4 . . . L2NW
5 . . . IoT server
6 . . . NW controller
40 . . . SW
60 . . . Adjustment processing unit
61 . . . Storage unit
100 to 110 . . . Burst data
400 . . . Control unit
410 . . . Queue
420 . . . Transmission unit

The invention claimed is:

1. A communication control system comprising:
a plurality of layer 2 switches; and
a control apparatus, wherein:
each of the plurality of layer 2 switches includes:
  a queue having a queue length being adjustable for each of transfer routes of data, and
  a transmitter transmitting the data stored in the queue for each of the transfer routes to a subsequent destination of the data at a data rate being adjustable for each of the transfer routes;
the control apparatus includes:
  an adjustment processor acquiring information representing a discarded data amount being a data amount of the data discarded in the queue from one of the plurality of layer 2 switches having discarded the data, and adjusting the queue length and the data rate of each of the plurality of layer 2 switches for each of the transfer routes, based on the discarded data amount; and each of the plurality of layer 2 and the control apparatus are implemented by computer executable instructions executed by at least one processor, wherein the adjustment processor determines whether or not the one of the plurality of layer 2 switches having discarded the data is present for each of the transfer routes based on the discarded data amount, and in accordance with a determination that the one of the plurality of layer 2 switches having discarded the data is present, in the one of the transfer routes, the adjustment processor adjusts, for each of the transfer routes, the queue length and the data rate so that the data of the discarded data amount is stored in a distributed manner in layer 2 switches at a subsequent stage with respect to the one of the plurality of layer 2 switches having discarded the data among the plurality of layer 2 switches and the one of the plurality of layer 2 switches having discarded the data.

2. The communication control system according to claim 1, wherein the adjustment processor acquires a data table including the subsequent destination information being information representing the subsequent destination from each of the plurality of layer 2 switches, identifies a first one of the plurality of layer 2 switches serving as a starting point and a second one of the plurality of layer 2 switches serving as an end point in one of the transfer routes based on each piece of the subsequent destination information, and identifies the one of the transfer routes by tracking each piece of the subsequent destination information sequentially from the data table acquired from the first one of the plurality of layer 2 switches serving as the starting point to the data table acquired from the second one of the plurality of layer 2 switches serving as the end point.

3. The communication control system according to claim 1, wherein the adjustment processor determines whether or not the one of the plurality of layer 2 switches having discarded the data is present for each of the transfer routes based on the discarded data amount, and in accordance with a determination that the one of the plurality of layer 2 switches having discarded the data is present, in the one of the transfer routes, the adjustment processor adjusts, for each of the transfer routes, the queue length and the data rate so that the data of the discarded data amount is stored in a distributed manner in each of the plurality of layer 2 switches other than the one of the plurality of layer 2 switches serving as a starting point.

4. A communication control method executed by a communication control system including a plurality of layer 2 switches and a control apparatus, each of the plurality of layer 2 switches including a queue having a queue length being adjustable for each of transfer routes of data, and a transmitter that transmits the data stored in the queue for each of the transfer routes to a subsequent destination of the data at a data rate being adjustable for each of the transfer routes, the communication control method comprising:

acquiring information representing a discarded data amount being a data amount of the data discarded in the queue from one of the plurality of layer 2 switches having discarded the data, and adjusting the queue length and the data rate of each of the plurality of layer 2 switches for each of the transfer routes, based on the discarded data amount; and determining whether or not the one of the plurality of layer 2 switches having discarded the data is present for each of the transfer routes based on the discarded data amount, and in accordance with a determination that the one of the plurality of layer 2 switches having discarded the data is present, in the one of the transfer routes, adjusting, for each of the transfer routes, the queue length and the data rate so that the data of the discarded data amount is stored in a distributed manner in layer 2 switches at a subsequent stage with respect to the one of the plurality of layer 2 switches having discarded the data among the plurality of layer 2 switches and the one of the plurality of layer 2 switches having discarded the data.

5. The communication control method according to claim 4, comprising:

acquiring a data table including the subsequent destination information being information representing the subsequent destination from each of the plurality of layer 2 switches, identifying a first one of the plurality of layer 2 switches serving as a starting point and a second one of the plurality of layer 2 switches serving as an end point in one of the transfer routes based on each piece of the subsequent destination information, and identifying the one of the transfer routes by tracking each piece of the subsequent destination information sequentially from the data table acquired from the first one of the plurality of layer 2 switches serving as the starting point to the data table acquired from the second one of the plurality of layer 2 switches serving as an end point.

6. The communication control method according to claim 4, comprising determining whether or not the one of the plurality of layer 2 switches having discarded the data is present for each of the transfer routes based on the discarded data amount, and in accordance with a determination that the one of the plurality of layer 2 switches having discarded the data is present, in the one of the transfer routes, adjusting, for each of the transfer routes, the queue length and the data rate so that the data of the discarded data amount is stored in a distributed manner in each of the plurality of layer 2 switches other than the one of the plurality of layer 2 switches serving as a starting point.

* * * * *